United States Patent [19]

Grueninger

[11] Patent Number: 5,505,758
[45] Date of Patent: Apr. 9, 1996

[54] GLASSWARE FORMING MACHINE

[75] Inventor: William Grueninger, Zurich, Switzerland

[73] Assignee: Emhart Glass Machinery Investments Inc., Wilmington, Del.

[21] Appl. No.: 227,078

[22] Filed: Apr. 13, 1994

[30] Foreign Application Priority Data

Apr. 15, 1993 [GB] United Kingdom ............... 9307859

[51] Int. Cl.$^6$ ................................................. C03B 35/10
[52] U.S. Cl. .................. 65/305; 65/267; 65/265; 65/355; 65/262
[58] Field of Search ............... 65/227, 243, 233, 65/232, 228, 229, 230, 231, 234, 235, 236, 237, 238, 239, 240, 241, 242, 244, 245, 246, 247, 248, 249, 250, 251, 252, 253, 254, 255, 256, 257, 355, 356, 267, 265, 261, 262

[56] References Cited

U.S. PATENT DOCUMENTS

| | | | |
|---|---|---|---|
| 3,914,120 | 10/1975 | Foster | 65/229 |
| 4,002,454 | 1/1977 | Rowe | 65/229 |
| 4,004,906 | 1/1977 | Rowe | 65/239 |
| 4,009,018 | 2/1977 | Nebelung et al. | 65/237 |
| 4,255,179 | 3/1981 | Foster | 65/230 |
| 4,362,544 | 12/1982 | Mallory | 65/163 |
| 4,743,286 | 5/1988 | Nebelung | 65/233 |

*Primary Examiner*—David L. Lacey
*Assistant Examiner*—Calvin Padgett
*Attorney, Agent, or Firm*—Spencer T. Smith

[57] ABSTRACT

An individual section glassware forming machine in which each section comprises a section module, which supports operating mechanisms of the machine, and a piping module through which the necessary air supplies are passed to the section module. The two modules are both mounted for movement into and out of operative position. When in operative position the section module is connected to the piping module and the piping module is connected to a transverse manifold which conveys the air supplies to all the sections.

5 Claims, 36 Drawing Sheets

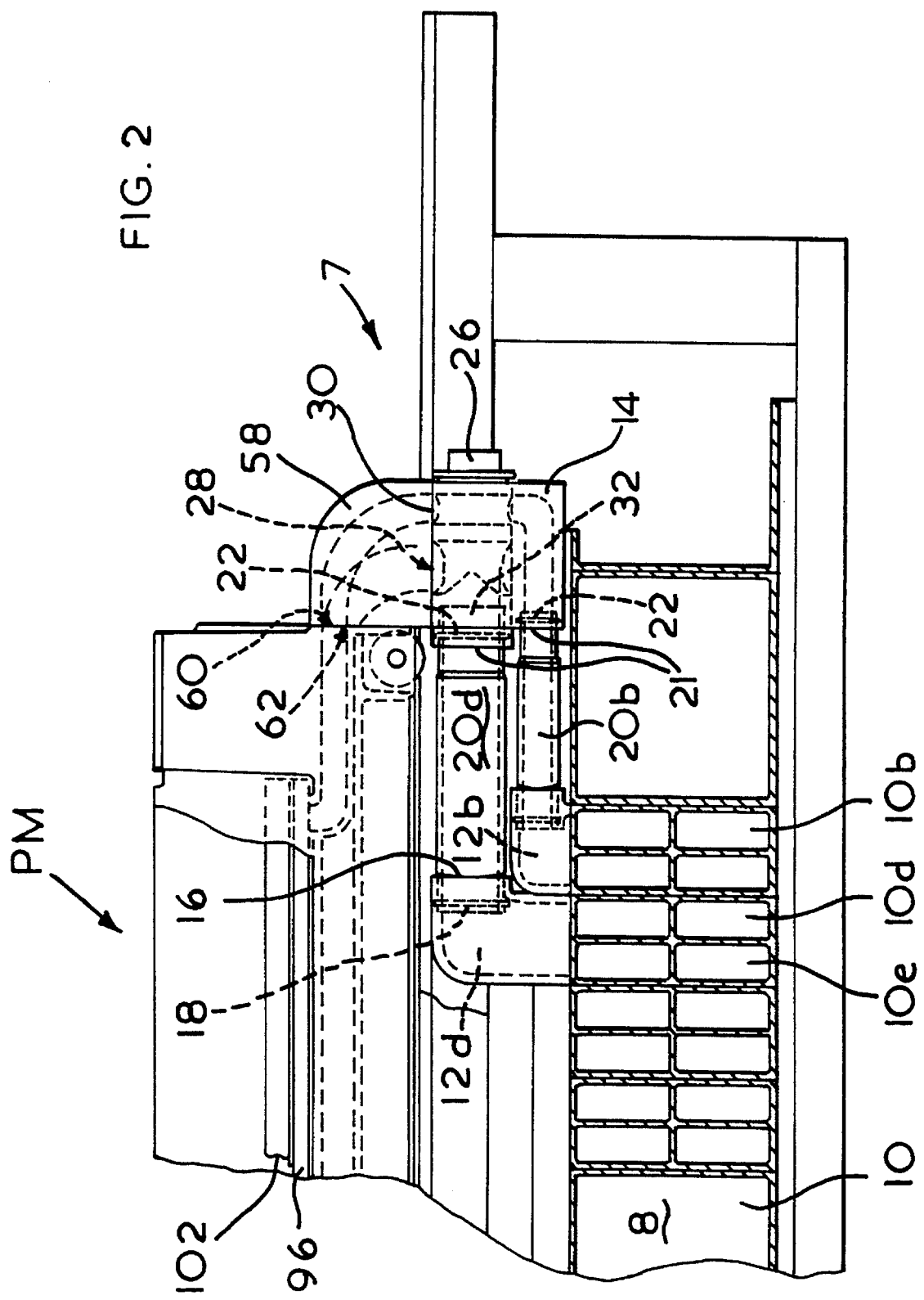

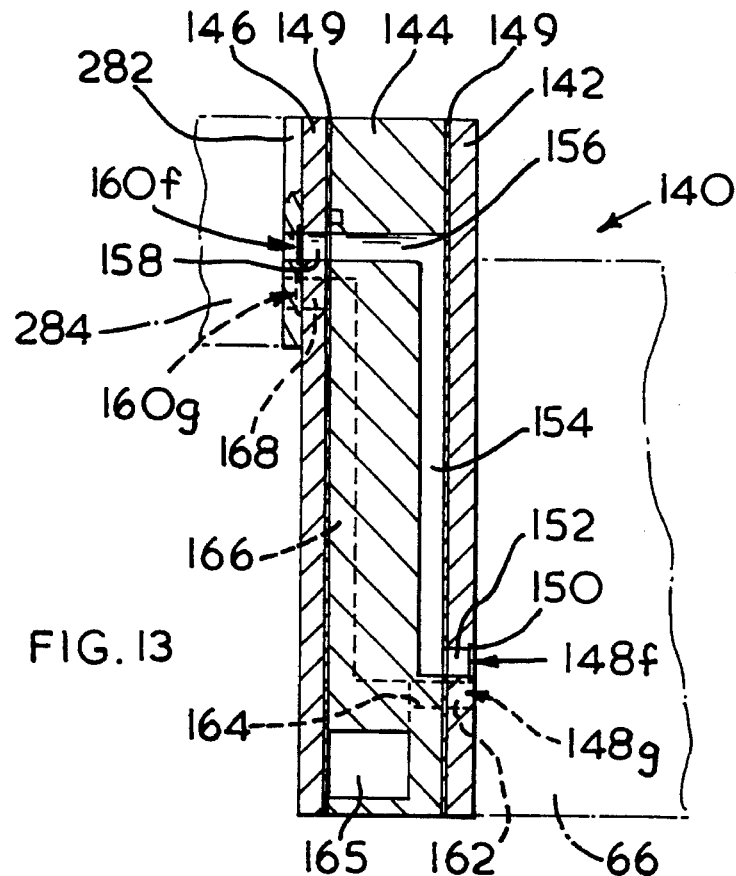
FIG. 13
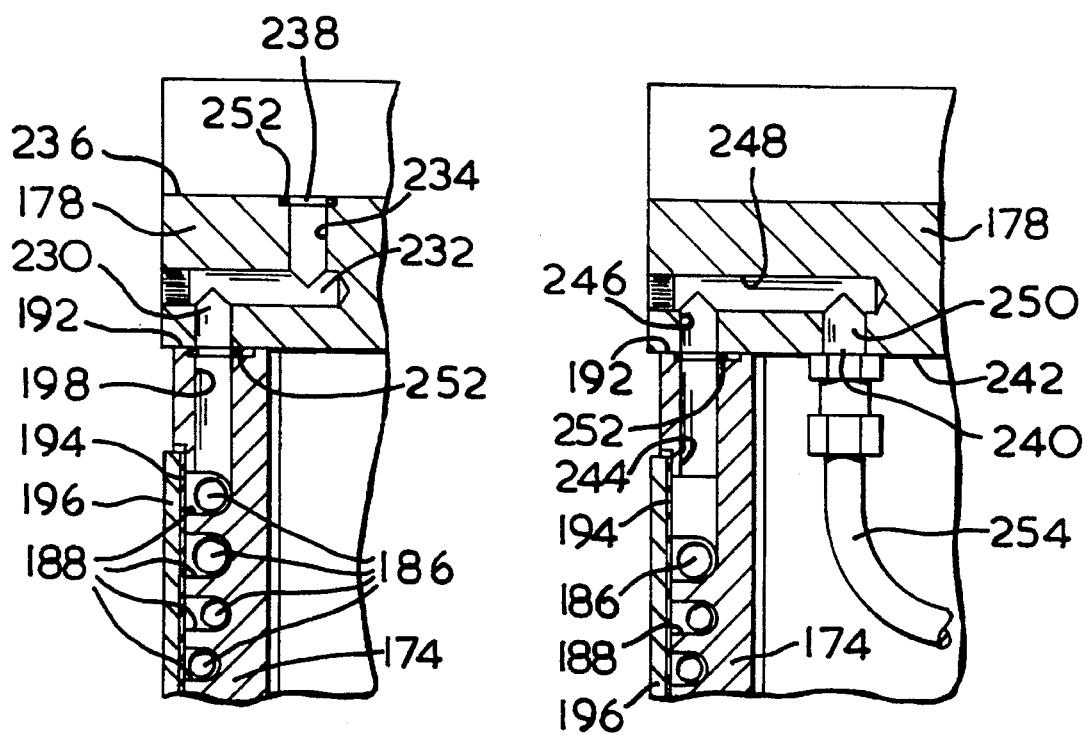
FIG. 14
FIG. 15

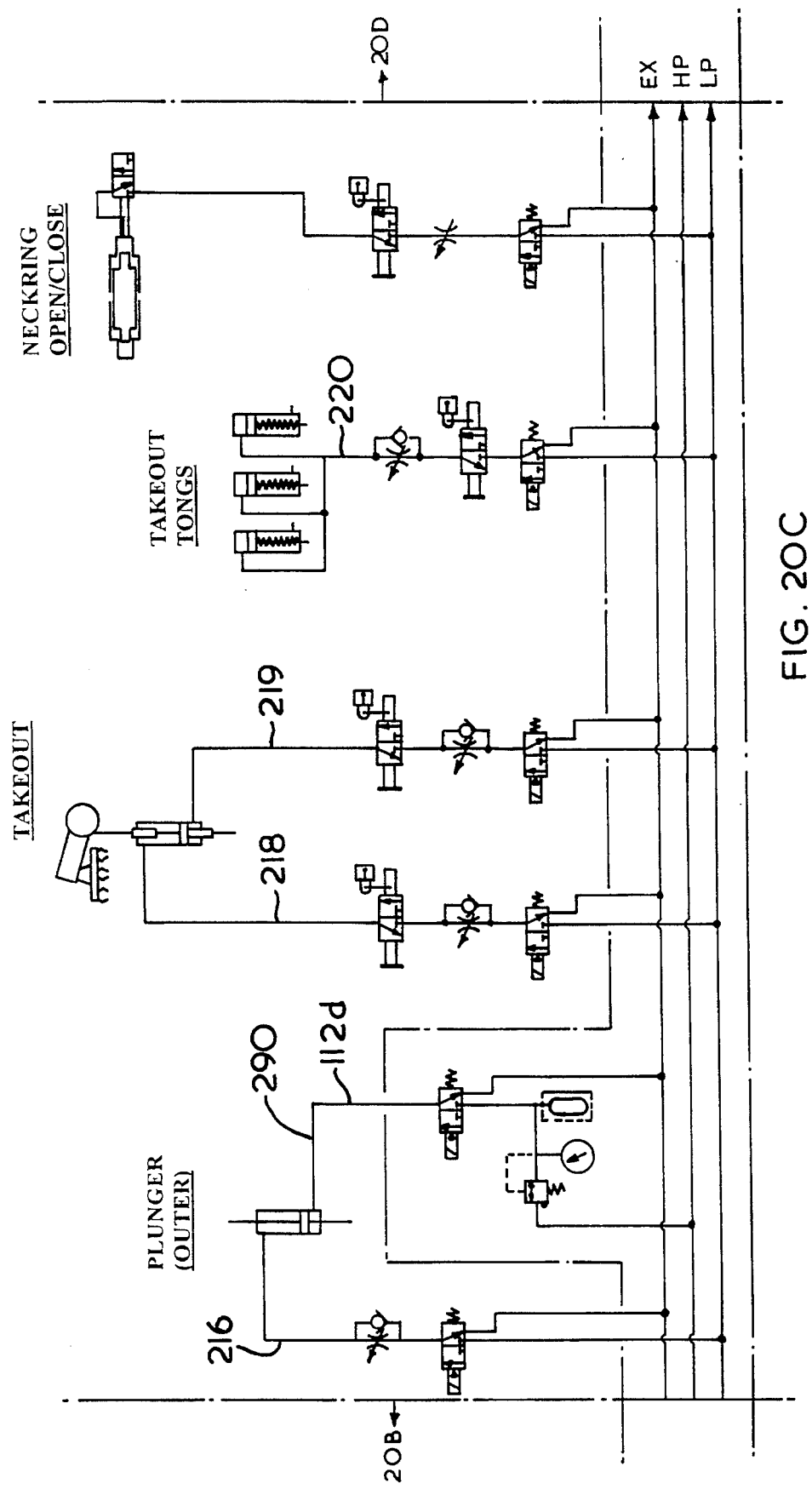

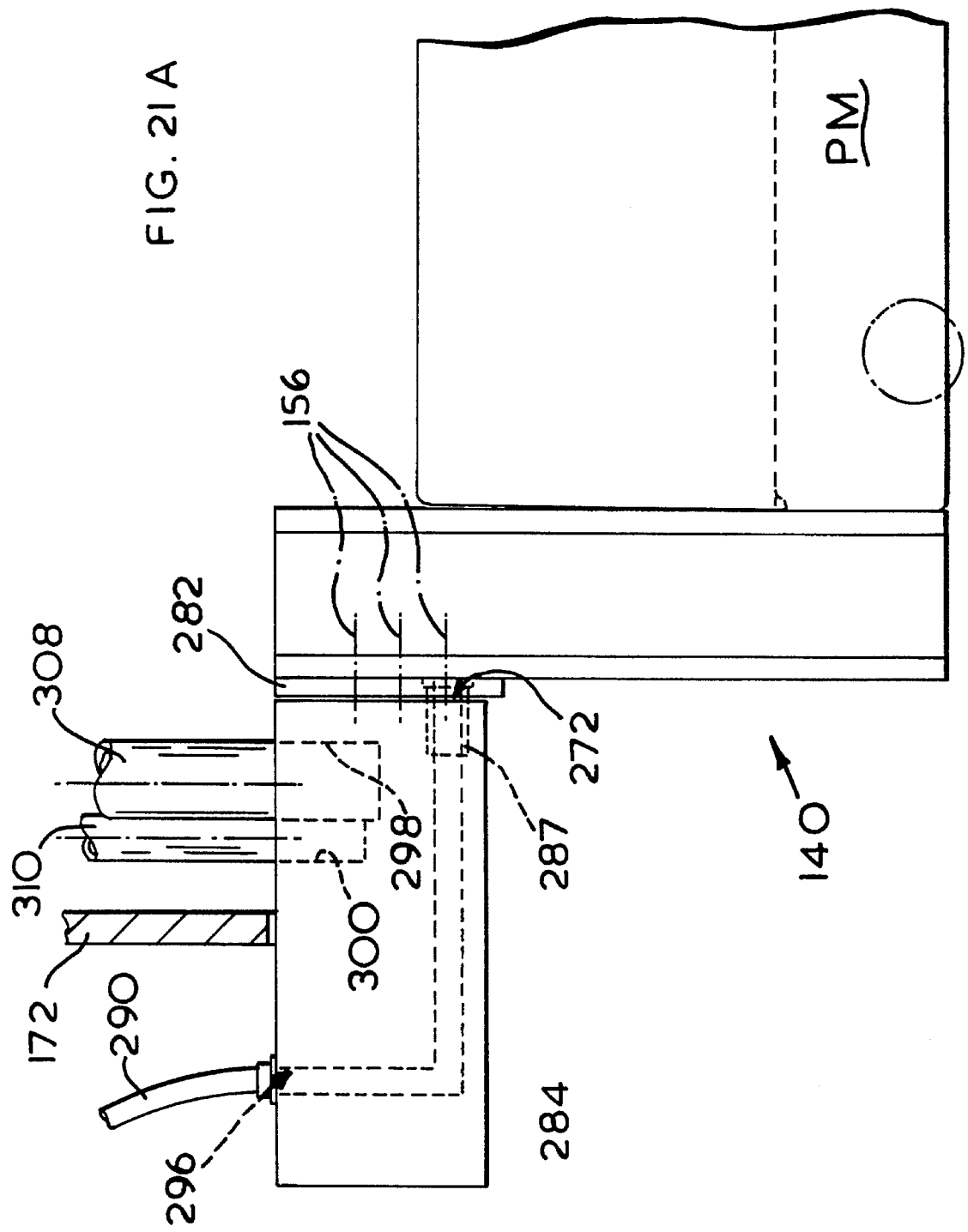

GLASSWARE FORMING MACHINE

This invention is concerned with machines for the manufacture of glassware.

BACKGROUND TO THE INVENTION

One of the most widely used types of machines for the manufacture of glassware is the so-called I.S. machine, which machine comprises a plurality of identical sections arranged side by side, the sections operating continuously out of time with each other to produce glassware. The I.S. machine has developed over the last sixty years from the original machine of this type described in U.S. Pat. No. 1,911,119— Ingle.

While during this period of sixty years there have been many improvements in I.S. machines, e.g. increased number of sections, increased numbers of moulds in each section, electronic control mechanisms replacing mechanical controls, the basic mechanical structure of the I.S. machine has remained unaltered.

Among the features which are common to almost all existing I.S. machines are the following;

1. The various mechanisms of the machine are integrated into a machine frame, and access to repair such mechanism is difficult.

2. The various mechanisms are generally pneumatically operated, and a complex array of piping is necessary to provide the required supplies of compressed air. This piping is very time consuming (and thus expensive) not only to assemble in manufacture but also to repair.

3. If any substantial repair is necessary to a section, the whole I.S. machine (i.e. all the sections) has to be shut down while the repair is carried out.

4. The various sections are mounted side by side in a machine frame, having upright frame members which support ancillary mechanisms, for example gob distributors. Air supplies to the various sections are provided from piping leading from these upright frame members. Consequently there is a risk of different pneumatic conditions obtaining in sections remote from the upright frame members and those close to them, a risk which increases with the number of sections in the machine which is now frequently 12 or more.

U.S. Pat. No. 4,362,544 describes an I.S. machine in which an attempt has been made to reduce the amount of piping which is involved in the construction of the machine. The machine comprises a plurality of similar sections arranged side by side and a base having a manifold which carries various air supplies for operating mechanisms of the sections of the machine. Further air supplies are also carried in overhead longitudinal frame housings and frame members. Thus, although it is not described in detail, the machine avoids the proliferation of piping taking air from the manifold and conveying it to various controlling valve blocks of the machine: however air from the valve blocks appear to be conveyed to the mechanisms through conventional piping.

The sections of this machine are, in other respects, entirely conventional. Consequently access to the sections for repair or replacement is still difficult, and should a section require major repair, it will be necessary to shut the machine down.

EP 184394 describes a fluid operated individual section glassware forming machine. The intention is that the machine should be capable of adaptation for either pneumatic or hydraulic operation, and to avoid the proliferation of pipes which would result, the machine is so constructed that fluid under pressure to operate the various mechanisms of the machine is provided through passageways formed in the plates providing the framework of the section. While the possibility of utilizing these passages for pneumatic operation is mentioned, it is not described; the description is of use of the passageways for hydraulic fluid while conventional pipe work is used for pneumatic operation. Consequently no indication is given of elimination of pipe work for pneumatic operation between the conventional valve block, used in such pneumatic operation, and the passageways. Particular problems would seem likely to arise in this respect as the initial part of the passageways are in a base plate of the section.

It is one of the objects of the present invention to provide an individual section glassware forming machine which is simpler to maintain and prepare.

BRIEF STATEMENT OF THE INVENTION

The present invention provides, in one of its aspects, an individual section glassware forming machine comprising a plurality of similar sections arranged side by side at section stations, each section comprising a section module which supports operating mechanisms of the section, which section module is mounted for movement lengthways of the section station into and out of operating position means for locating the section module in its operating position including a stop for determining the position of the section module lengthwise of the station and an orienting member extending lengthwise of the section station for determining the alignment of the section module widthways of the section station and means whereby, when the section module is in its operating position, it can be connected to the necessary air supplies.

The present invention provides, in another of its aspects an individual section glassware forming machine comprising a plurality of similar sections arranged side by side at section stations the machine comprising a base having a manifold which extends across all the sections stations and carries operating air supplies for the sections each section comprising a section module which supports operating mechanisms of the section the section module being mounted for movement lengthways of the section station into and out of operating position and means for connecting the section module to operating air supplies provided from the manifold when the module is in its operating position.

The present invention provides, in yet another of its aspects an individual section glassware forming machine comprising a plurality of similar sections arranged side by side at section stations each section comprising a section module which supports the mechanisms of the machine and a piping module which distributes operating air supplies to the section module the section module being mounted for movement lengthways of the section station into and out of operating position the piping module being mounted for movement lengthways of the section station into and out of operating position the arrangement being such that the section module can be moved into its operating position from the rear of the section station, and the piping module can then be moved into the operating position from the rear of the station and exit ports of the piping module which carry operating air supplies mated on such movement into operating position with corresponding entry ports of the section module.

The present invention also provides, in another of its aspects an individual section glassware forming machine comprising a plurality of similar sections arranged side by side at section stations, the machine comprising a base having a manifold which extends across all the section stations and carries operating air supplies for the sections, each section comprising a section module, which supports operating mechanisms of the machine and a piping module which distributes operating air supplies from the manifold to the section module the section module being mounted for movement lengthways of the section station into and out of operating position, the piping module being mounted for movement lengthways of the section station into and out of operating position means being provided for interconnecting the section module, the piping module and the manifold when the two modules are in their operating positions, and for providing the passage of the operating air supplies from the manifold to the section module.

The present invention provides, in another of its aspects an individual section glassware forming machine comprising a plurality of similar sections arranged side by side at section stations the machine comprising a base having manifold which extends across all the section stations and comprises a series of transverse passages carrying operating air supplies for the section, each section station comprising a shut off valve block to which operating air supplies are passed from the manifold, each section comprising a section module (which supports the operating mechanisms of the section) and a piping module (which distributes operating air supplies from the shut off vale to the section module), the section module being mounted for movement lengthways of the section station into and out of operating position, the piping module being mounted for movement lengthways of the section station into and out of operating position, the section module comprising a series of entry ports for receiving the necessary air supplies, which entry ports when the section module and the piping module are in the operating position, mate with a corresponding series of exit ports of piping module, the piping module comprising connecting means which comprise a series of entry ports for receiving the necessary air supplies, which entry ports, when the piping module is in its operating position mate with a corresponding series of exit ports in the shut off valve block.

In an I.S. machine according to the invention, should a section module or a piping module require replacement or repair, the piping module can simply be released from the connection to the manifold and removed from the machine—after which the section module can also be removed from the machine, without any interruption of operation of the other sections of the machine.

BRIEF DESCRIPTION OF THE DRAWINGS

In the accompanying drawings

FIG. 2 shows certain parts of FIG. 1 enlarged and in section;

FIG. 13 shows a view in section along the line XIII—XIII of FIG. 12.

FIG. 14 shows a view along a line XIV—XIV of FIG. 23

FIG. 15 shows a view along a line XV—XV of FIG. 23

FIG. 21A shows a side view of the connector between the piping module and the section module

FIG. 29A shows a front face of a housing block.

DESCRIPTION OF THE PREFERRED EMBODIMENT

Figure 1:
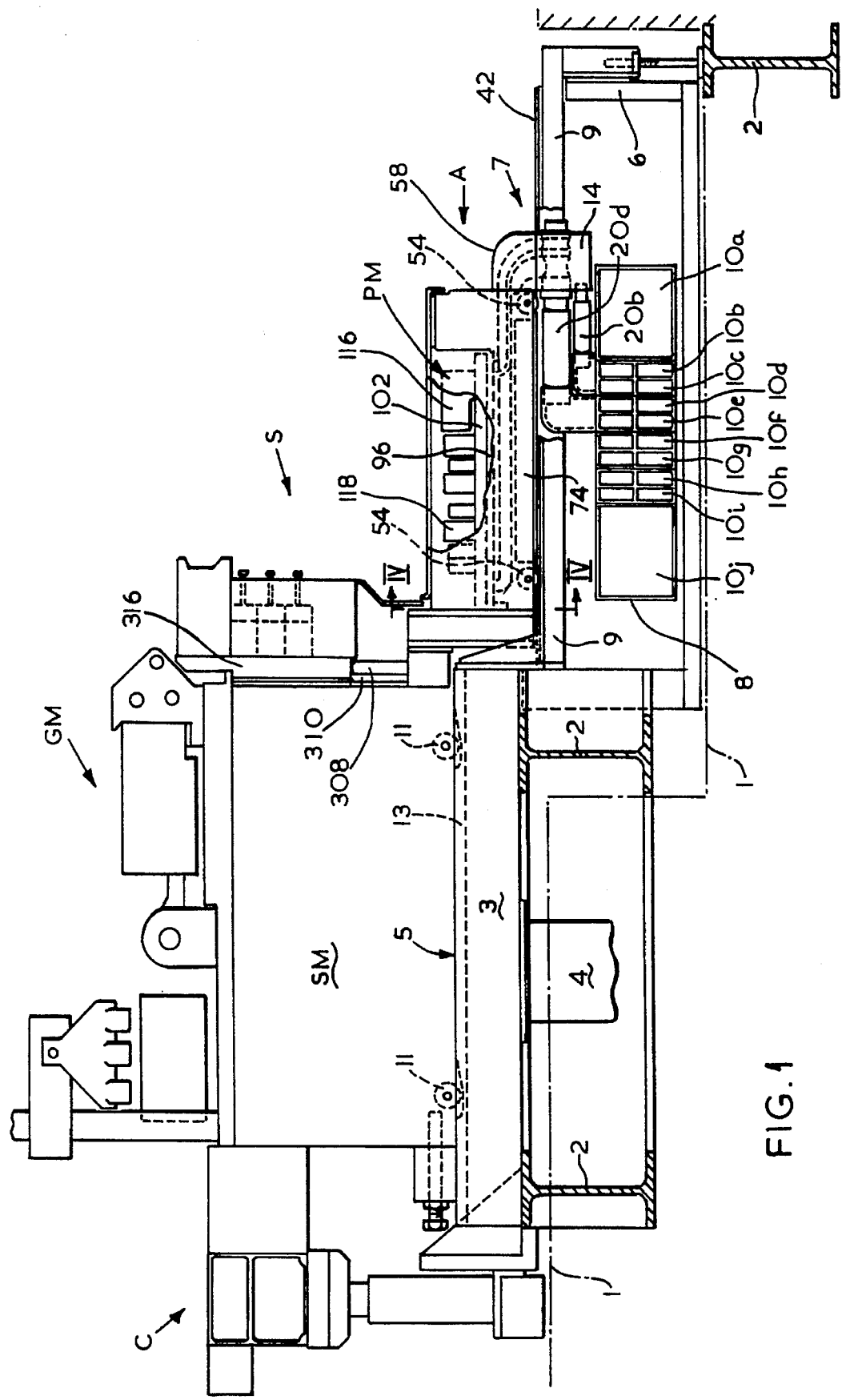
FIG. 1 shows a side view of a section of a glassware forming machine embodying the invention.

An individual section of a glassware forming machine embodying the invention comprises a plurality [usually 8–12] of similar sections S arranged side by side at section stations. Each of the sections comprises a section module SM and a piping module PM, which are interconnected with each other. Each section module SM supports the various glass forming mechanisms GM (diagrammatically indicated in FIG. 1) of the section, while the piping module PM supplies air needed to operate such mechanisms.

The machine is supported on a floor 1, comprising transverse supporting girders 2 providing an upper and a lower portion of the floor 1. Supported on the upper portion of the floor 1 is a base framework 3 in the form of a box for each section and having an upper surface 5 on which, as will be described, a section module SM is located. Behind the base framework 3 is a subsidiary framework 6 supported on the lower portion of the floor 1: as will be described the piping modules PM are supported on the subsidiary framework 6. A pipe 4 leading from a supply of cooling air passes upwardly through the floor 1 and into the interior of the framework 3 at each section. A conveyor C is supported on the floor 1 and extends past all the section stations to remove formed containers from the sections in a conventional manner.

At each section station, the piping module PM and the section module SM are mounted so that they can be moved into and out of operating positions. Extending transversely across all the section stations through the subsidiary framework 6 is a manifold 8 which comprises a series of transverse parallel air supply passages 10. When the section module SM and the piping module PM are in their operating positions at the section station, the section module SM is connected to the piping module PM and the piping module PM can be connected to the air supply passages 10. When desired, for repair or replacement, the piping module PM can be simply disconnected from the air supply passages 10 and from the section module SM and removed from the section station, and the section module SM can then itself, if required, be removed from the section station without necessitating any interruption of operation of the other sections of the machine.

The construction and operation of the Section Module SM and Piping Module PM at one section of the machine will be described—it will be understood that the Section Modules SM and Piping Modules PM at the other section stations are similar. The machine will be described as set up for what is known as 'Narrow Neck Press and Blow" operation, although as will become apparent it may readily be adapted for other forms of operation for example Blow and Blow.

In an individual section glassware forming machine the air which serves to cause movement of the parts of the mechanisms of the machine is termed 'operating air'. Normally operating air comprises air containing a certain amount of suspended oil as a lubricant. Vacuum and exhaust connections are also normally viewed as 'operating air' and the phrase 'operating air supplies' when used herein will be used to include not only air for causing movement of machine parts, but also exhaust and vacuum associated with it.

Air supplies which come into contact with the glass are termed 'forming air supplies' and do not contain suspended oil. Mould cooling air, or cooling wind, is distinct from both operating air and forming air.

Operating air supplies are provided to each section through the transverse supply passages 10. There are ten of these supply passages which carry the following operating air supplies:

10$a$ Vacuum

10$b$ Low pressure—pilot air

10$c$ Low pressure—plunger cooling air

10$d$ & 10$e$ High pressure air

10$f$ Plunger up air

10$g$ Spare

10$h$ & 10$i$ Low pressure air

10$j$ Exhaust

At each section station of the machine, a connecting assembly 7 is provided which connects the transverse supply passages 10 to the piping module PM at the station.

Figure 3:
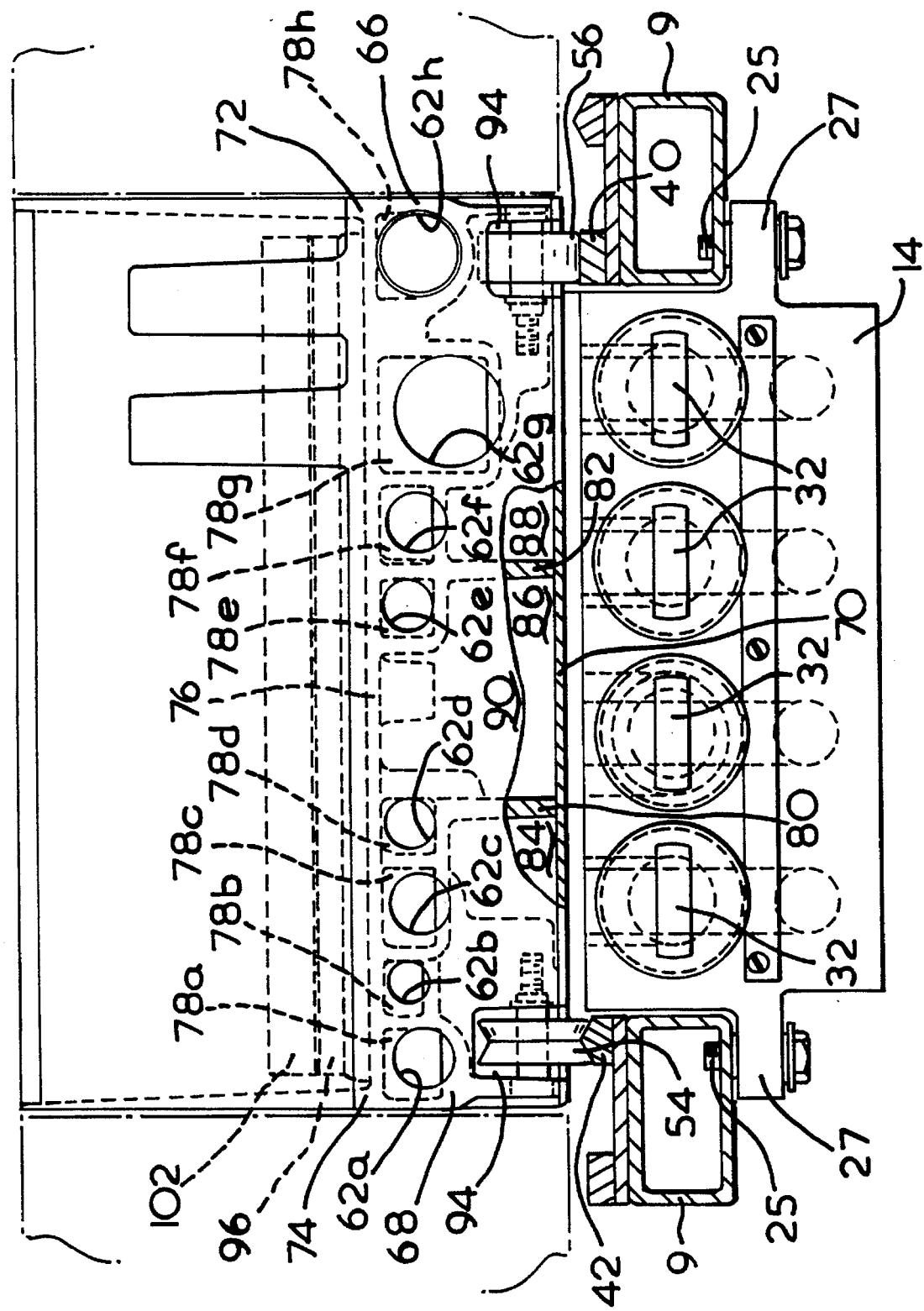
FIG. 3 shows a rear end view of a piping module of the section and of a shut off block, with the connector removed.
Figure 4:
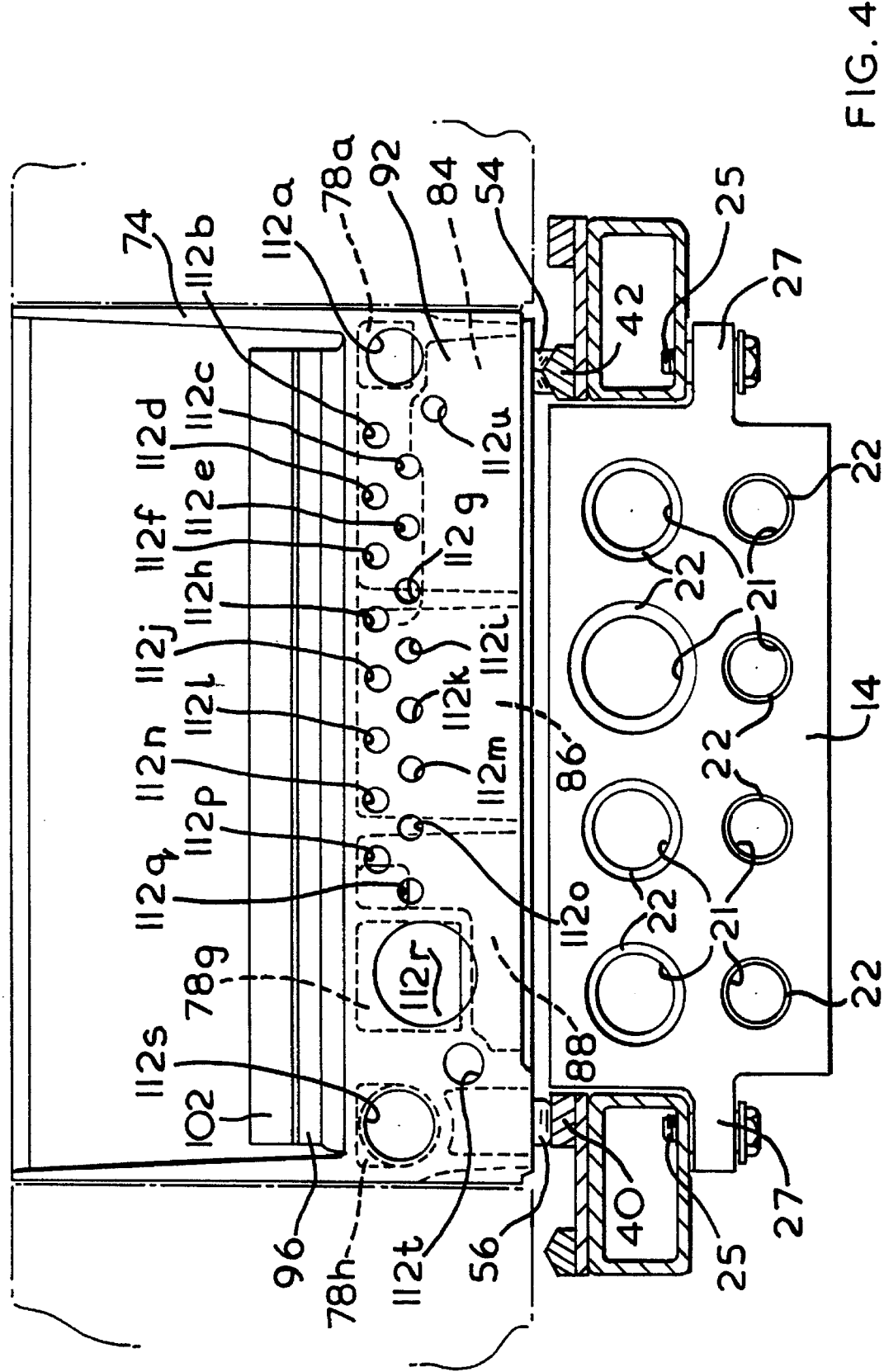
FIG. 4 shows a forward end view of the piping module; taken along the line IV— IV of FIG. 1.
Figure 5:
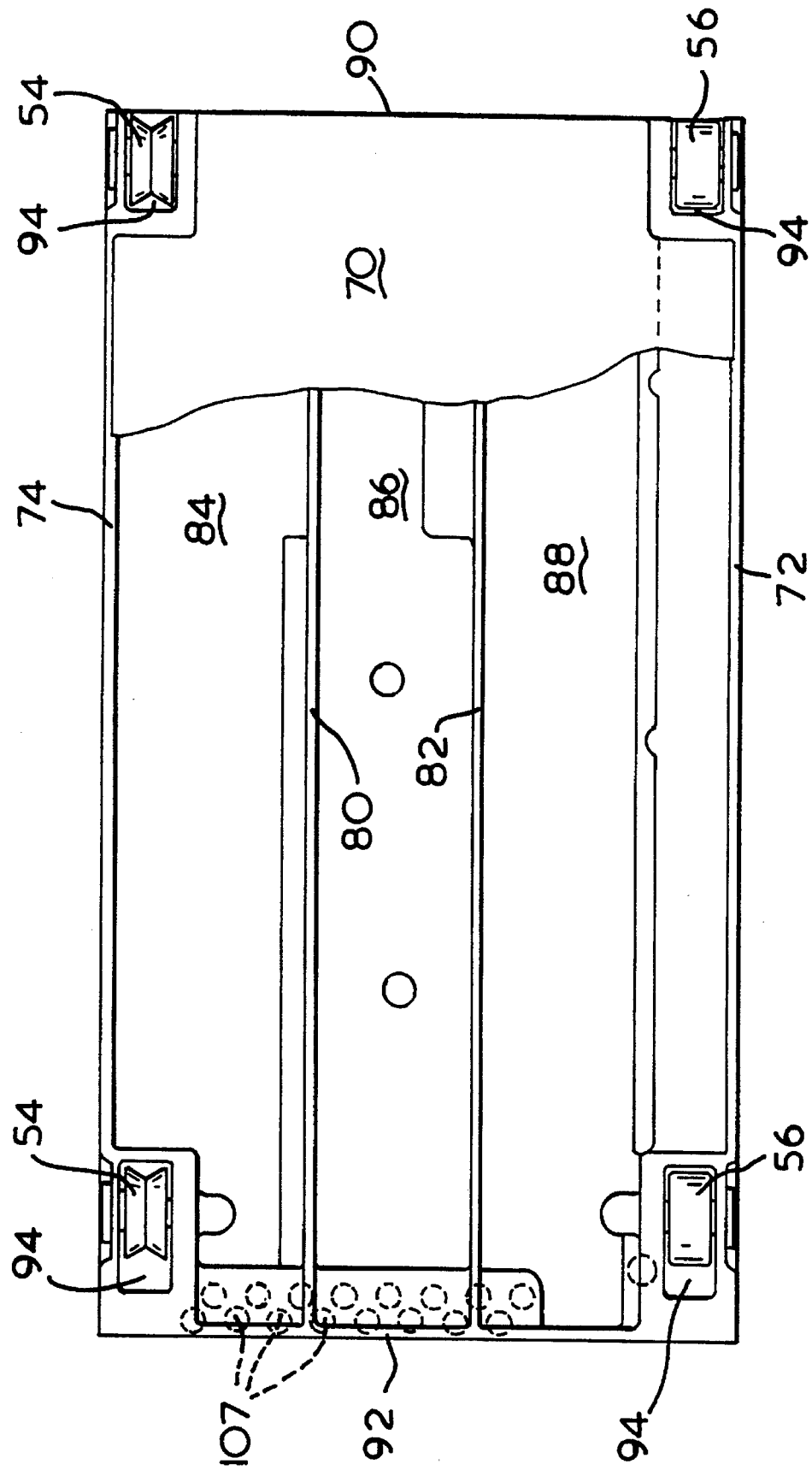
FIG. 5 shows an underneath view of the piping module.

At each section station the subsidiary framework 6 comprises two longitudinal supporting members 9 each of which has one end attached to the base framework 3 and an opposite end supported on one of the girders 2 of the floor 1. Each of the supporting members 9 supports a rail 40 and a rail 42, (FIG. 3) the rail 40, on one member 9 and the rail 42 on an adjacent member 9 being associated with the same one section, each supporting member 9 thus being part of the subsidiary framework 6 at two adjacent section stations.

Figure 2A:
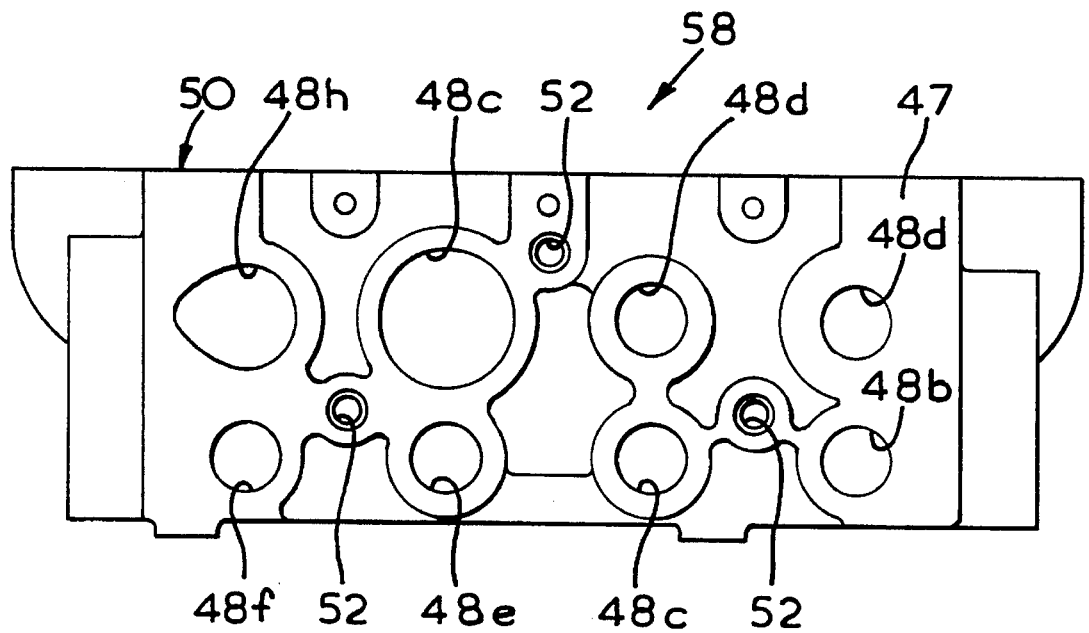
FIG. 2A shows an underside view of a connector
Figure 2B:
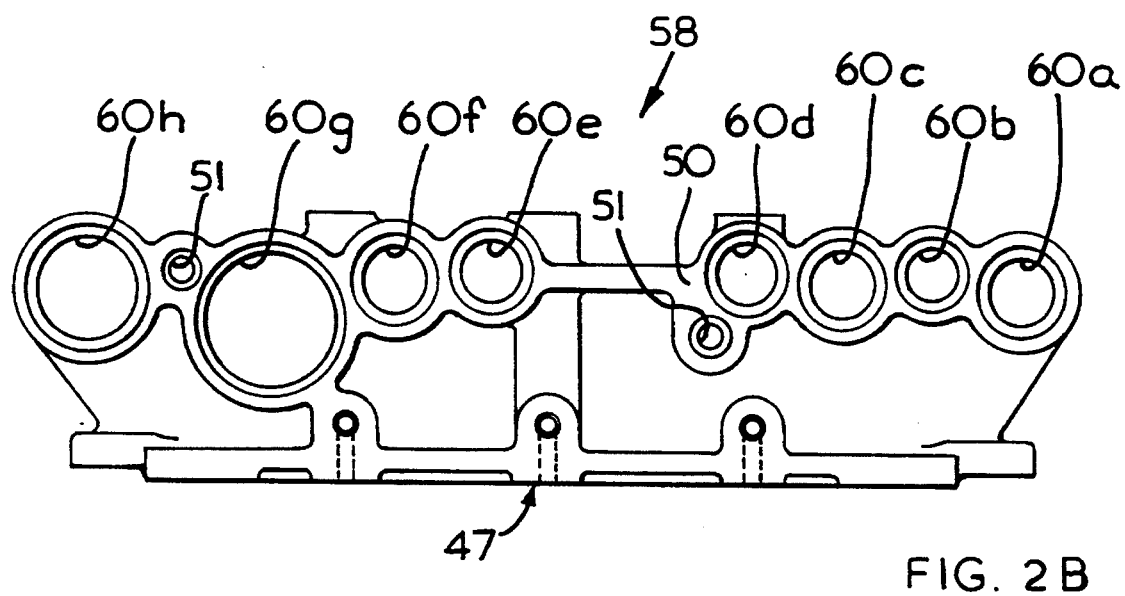
FIG. 2B shows a forward end view of the connector

The connecting assembly 7 (FIG. 2) comprises a series of right angled pipes (12$a$, 12$b$ . . . ) each connected to a separate supply passage (10$a$, 10$b$ . . . ) Each pipe 12 has an opening 16 provided with an O ring 18, and push fitted into the opening 16 is one end of a supply pipe (20$a$, 20$b$ . . . ) (only some of which are shown in FIG. 2). The other end of each supply pipe 20 is also push fitted into an entry port 21 of a shut off block 14 of the connecting assembly, again sealed by an O ring 22. The port 21 leads to a shut off valve 26, which has an exit port 28 formed in a flat upper surface 30 of the shut off block 14.

The shut off block 14 is mounted in the framework 6 between the supporting members 9 by bolts 25 (see FIG. 3) extending through holes in lugs 27 of the block 14 which holes allow limited movement of the block 14 with respect to the supporting members 9. The block 14 comprises a series of passages each associated with the air supply from appropriate supply passages 10, each passage of the shut off block 14 leading from an entry port 21, past a valve member 32 in the form of a spool, to an exit port 28. Each entry port is thus connected, through the associated supply pipes 20, to a pipe 12, and the push fitting of the supply pipes 20 both into the pipes 12 and into the shut off block 14 means that the pipes 20 are also capable of accommodating a limited amount of relative movement between the shut off block 14 and the manifold 8 without leading to any leakage of air between the pipes 12 and the supply pipes 20 or between the pipes 20 and the block 14. The shut off valve 26 comprises four similar spools 32 which may each be either in an off position (in which none of the pipes 20 leading to the supply passages 10 are connected to exit ports 28 of the shut off valve) or in an on-position in which all of the pipes 20 are connected to the exit ports 28.

So far as passages 10d and 10e, and 10h and 10i, are concerned, a single pipe 12 is connected in each instance to the pair of passages, thus leading to eight different supplies through the shut off block 14 to the piping module PM.

At each section station, the section module SM and the piping module PM are each mounted for movement lengthways of the section station in and out of their operating positions. It will be understood that the operating position of the section module SM is that in which the mechanisms of the module are properly aligned to receive glass from glass supply means of the machine (not shown) and to pass out formed containers to the conveyor C.

Figure 1A:
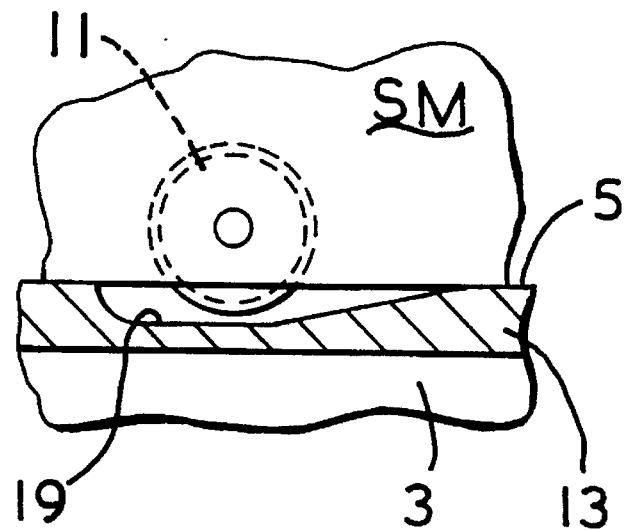
FIG. 1A shows a detail of a wheel of a section module of the section.
Figure 1B:
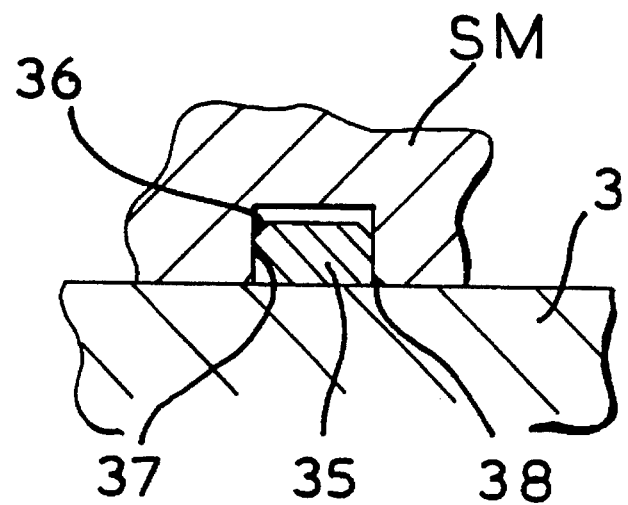
FIG. 1B shows a detail of locating means of the section module

The section module SM comprises four wheels 11 (FIGS. 1 & 1A) which are mounted to run on rails 13 providing part of the upper surface 5 of the base framework 3. The rail 13 on the right hand side of the section station has a flat upper surface on which wheels 11 having a flat circumference run, while the rail 13 on the left hand side of the section station has a bevelled upper surface on which wheels 11 having a corresponding recessed surface, run (similar to the arrangement shown, in FIG. 3 in relation to the piping module). Thus the module SM is constrained against sideward movement along the rails 13.

Secured to the framework 3 is a stop 15 which supports a bolt 17. The rails 13 (FIG. 1A) each comprise recesses 19 which are so arranged that when the section module SM is pushed along the rails 13, as a forward locating face 23 of the module approaches the stop 15, the wheels 11 move into the recesses 19, so that the section module is no longer riding on the wheels 11 but makes good contact with the upper surface 5 of the base framework 3, thus allowing for the passage of cooling air from the pipe 4 into the module. The Section module can then be pulled into its operative position by tightening the bolt 17, which engages in a threaded bore in the forward locating face 23, until the face 23 engages the stop 15.

The Section Module SM is also held transversely in its operative position. Spaced apart on the top surface of the base framework 3, adjacent opposite ends of section module SM are orienting members in the form of two longitudinal extending locating blocks 35 which are chamfered at their upper edges at 36. The lower face of the Section module is provided with corresponding grooves 37 having chamfered edges 38. When the section module is moving along the rails 13, the grooves 37 are held above the level of the blocks 35: when the section module reaches its operative position and drops, the blocks 35 enter the grooves 37 and provide for accurate transverse location of the section module.

The piping module PM is also arranged for movement lengthways of the section station into and out of its operating position on the rails 40, 42. The rail 40 (see FIG. 3) has a flat running surface, and the rail 42 has a bevelled running surface.

The piping module PM is provided with two recessed wheels 54 at one side, which run on the bevelled rail 42, and two flat wheels 56 at the other side, which run on the flat rail 40. It is not necessary to provide any recesses in the rails 40,42 to assist in locating the piping module in position: as will be hereinafter described it is located by engagement with the section module SM and the shut off block 14.

The removal of the piping module PM from the section station will be explained below, but once the piping module PM has been removed, if it is then desired to remove the section module SM from the section station the bolt 17 is freed, an auxiliary support (not shown) having rails corresponding to the rails 13 is positioned over the subsidiary framework 6, and the section module is pulled rearwardly until the wheels 11 run out of the recesses 19 onto the rails 13, when the section module may readily be moved along the rails 13 and onto the rails of the auxiliary support for repair or removal.

The piping module PM comprises a connector 58 (FIGS. 2A and 2) which, when the piping module is in its operating position, mates with the shut off block 14.

The connector 58 comprises a flat bottom face 47 which comprises a series of eight entry ports 48a . . . 48h which are positioned to correspond with the series of exit ports 28 in the flat upper surface 30 of the shut off block 14.

Each entry port 48 leads through a right angled passage to a corresponding exit port 60a . . . 60h formed in a vertical face 50 of the connector 58. The connector 58 is secured to the piping module by horizontal bolts extending through bolt holes 51. When the piping module PM is in its operating position, the connector 58 is positioned over the shut off block 14 and is secured to it by bolts extending through vertical bolt holes 52.

O rings are provided around the exit ports 28 of the shut off valve block 14 and around the exit ports 60 of the connector 58, so that when the connector 58 is firmly secured to the piping module PM and to the shut off block 14 an air tight seal is provided between the various entry and exit ports. Any small lack of correspondence in position between the connector 58 and the shut off block 14 is taken up by the limited movement of the shut off block with respect to the framework 6.

The series of exit ports 60a . . . 60h of the connector 58 mate with a series of entry ports 62a . . . 62h of a piping assembly 64 of the piping module PM.

The eight entry ports 48a . . .48h of the connector 58 and the eight entry ports 62a . . . 62h of the piping assembly 64 respectively receive

| 48a, | 62a | High Pressure Air |
| 48b, | 62b | Pilot Air |
| 48c, | 62c | Spare |
| 48d, | 62d | Plunger Up |
| 48e, | 62e | Plunger cooling |
| 48f, | 62f | Vacuum |
| 48g, | 62g | Exhaust |
| 48h, | 62h | Low pressure air |

The piping module PM will now be described with particular reference to FIGS. 3,4,5 and 6.

The piping assembly 64 comprises a base casting 66 generally in the form of a box, having a base portion 68 which is provided with a series of passageways and reservoirs.

The base portion 68 comprises a base wall 70, side walls 72, 74 extending upwardly from the base wall 70, and an upper wall 76 extending between the side walls 72, 74, which continue upwardly past the upper wall 76. Formed on an underface of the upper wall 76 are a series of air channels 78a, 78b, 78c, 78d, 78e, 78f, 78g and 78h. Internal walls 80,82, extend upwardly from the base wall 70, and provide three reservoir chambers 84, 86, 88, which extend for most of the length of the casting 66. End walls 90, 92 of the casting enclose the chambers 84, 86, 88.

The wheels 54,56 are mounted in recesses 94 provided in the base wall 70.

Figure 6:
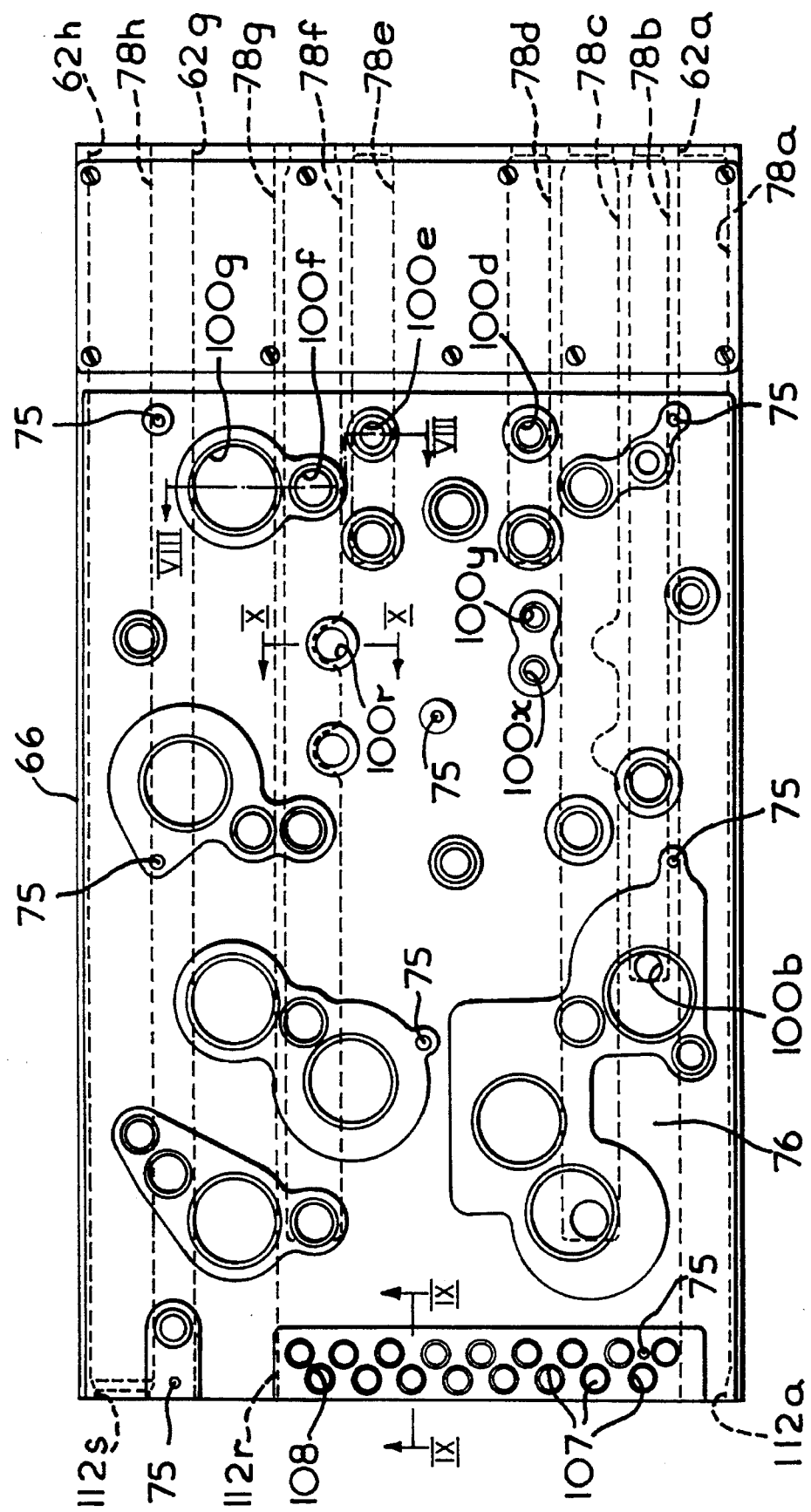
FIG. 6 shows a view of a base casting of the piping module from above.

The entry ports 62a–62h which lead to the channels 78a–78h respectively are formed in the end wall 90. A cover plate 96 and a valve plate 102 overlie the upper wall 76 and are secured to the upper wall 76 by bolts which pass through the cover plate 96 and the valve plate 102 into threaded bores 75 in the casting 66 (FIG. 6). The upper wall 76 is provided with a series of apertures 100 which provide supply connections which lead to the various channels 78 and to the reservoir chambers 84, 86, 88. FIG. 8 shows a section taken along the line VIII—VIII of FIG. 6, showing the channels 78e, 78f and 78g of the base casting 66 and apertures 100e, 100f and 100g in the wall 76 leading to these channels. Holes 98 in the cover plate 96 (FIG. 7) correspond with the apertures 100 in the wall 76 and form part of the supply connections.

Figure 10:
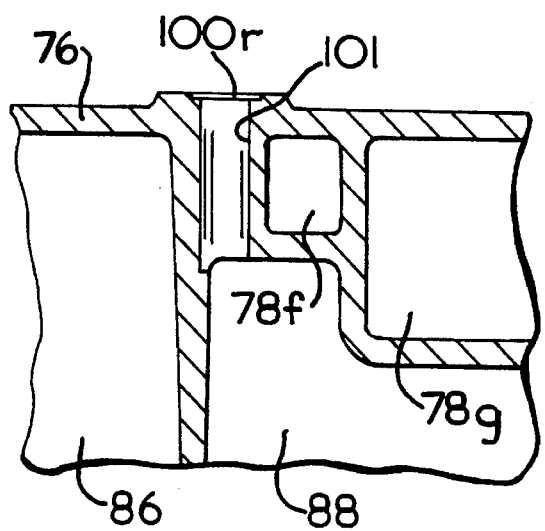
FIG. 10 shows a view along X—X of FIG. 6.

FIG. 10 shows a section taken along the line X—X of FIG. 6, showing the channels 78f and 78g, portions of the two reservoir chambers 86 and 88, and an aperture 100r in the wall 76 which leads to a passageway 101 providing a supply connection to the reservoir 88. A hole 98r in the coverplate 96 corresponds with the aperture 100r and forms part of the supply connection.

Figure 7:
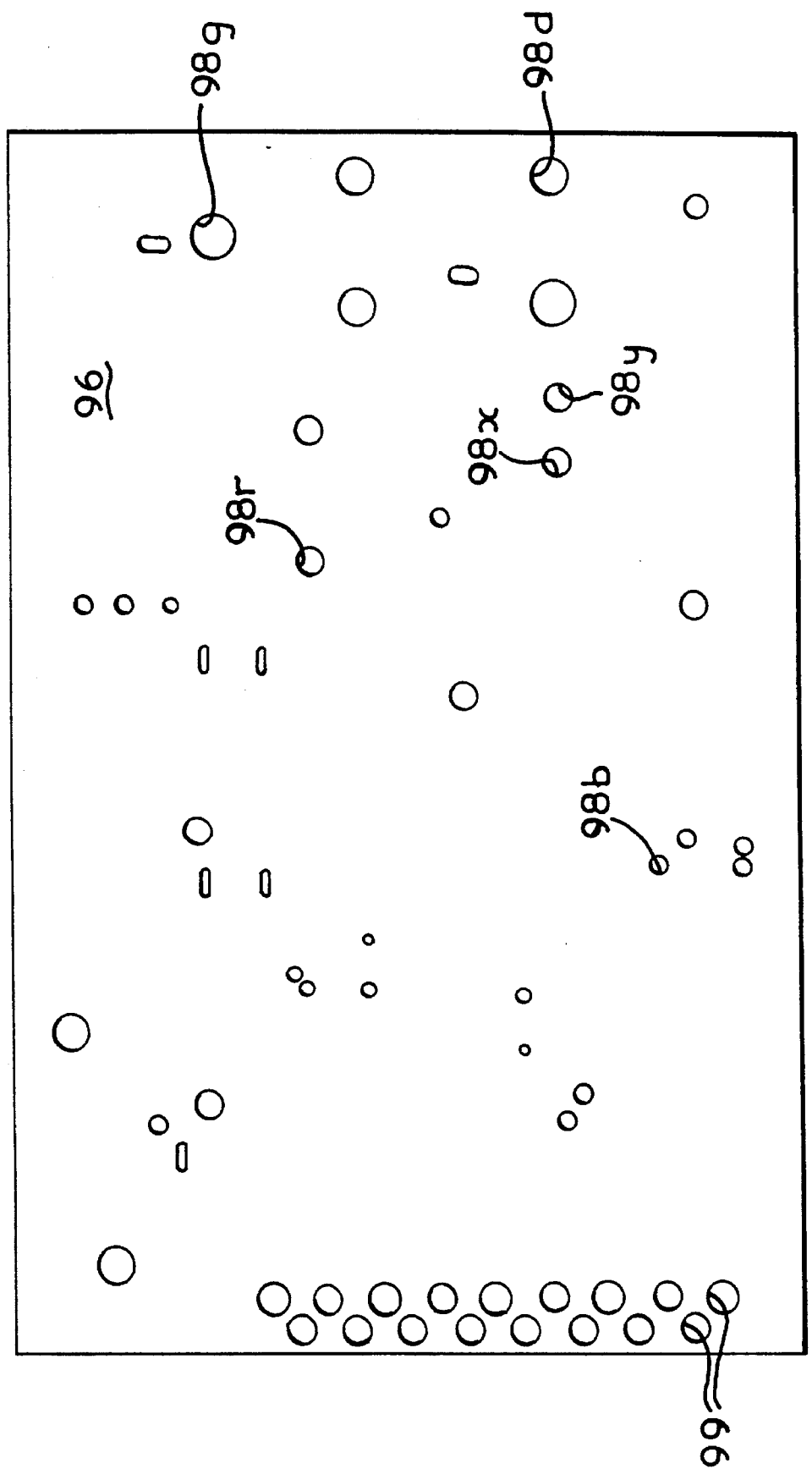
FIG. 7 shows a plan view of a cover plate of the piping module.
Figure 8:
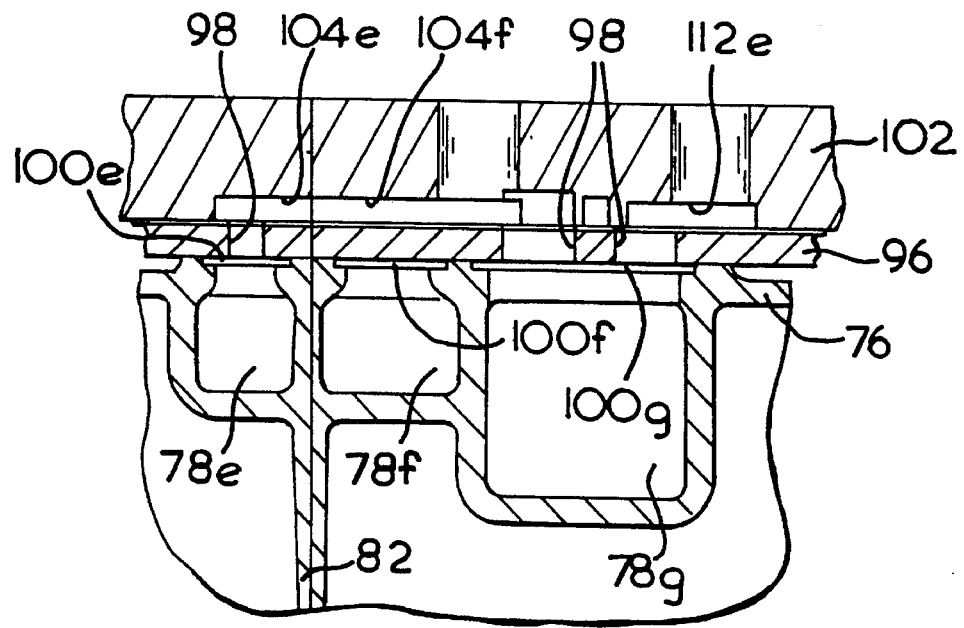
FIG. 8 shows a view along VIII—VIII of FIG. 6.

The cover plate 96 is shown in FIG. 7. It comprises a series of holes 98, which, when the cover plate is positioned over the upper wall 76 of the piping casting, correspond with the apertures 100 in the wall 76, forming supply connections therewith, and a further series of holes 99 which correspond with apertures 107 in the wall 76, the holes 99 and apertures 107 also forming supply connections.

Figure 9:
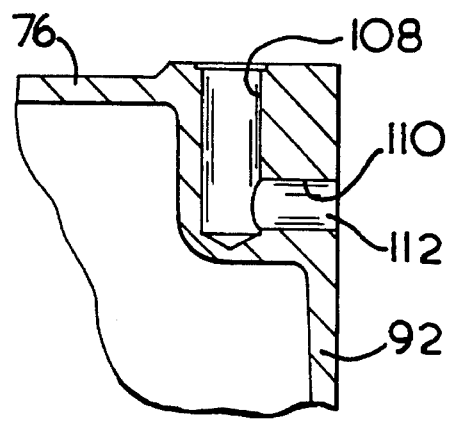
FIG. 9 shows a view along IX—IX of FIG. 6.
Figure 11:
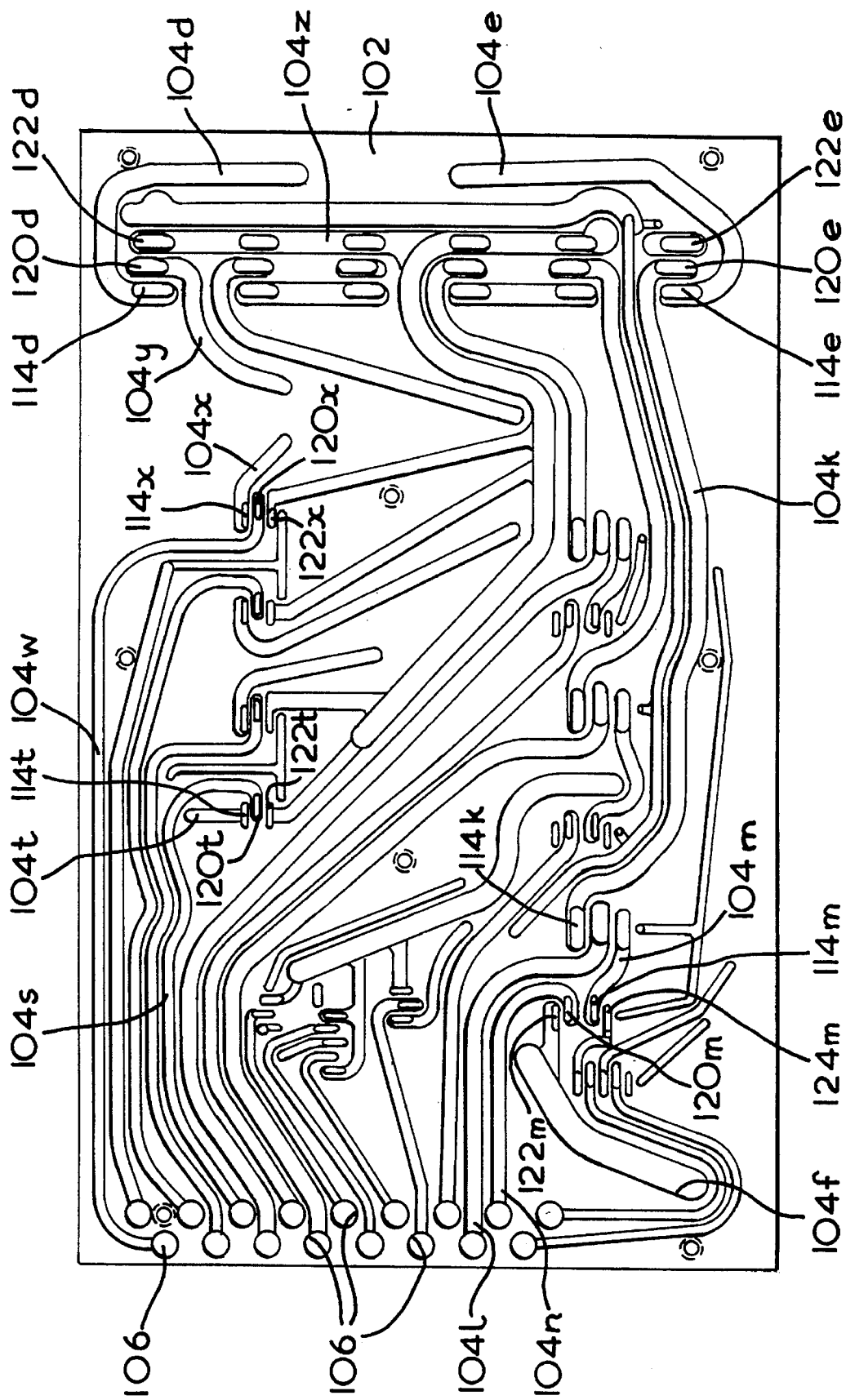
FIG. 11 shows an underneath view of a valve plate.
Figure 11A:
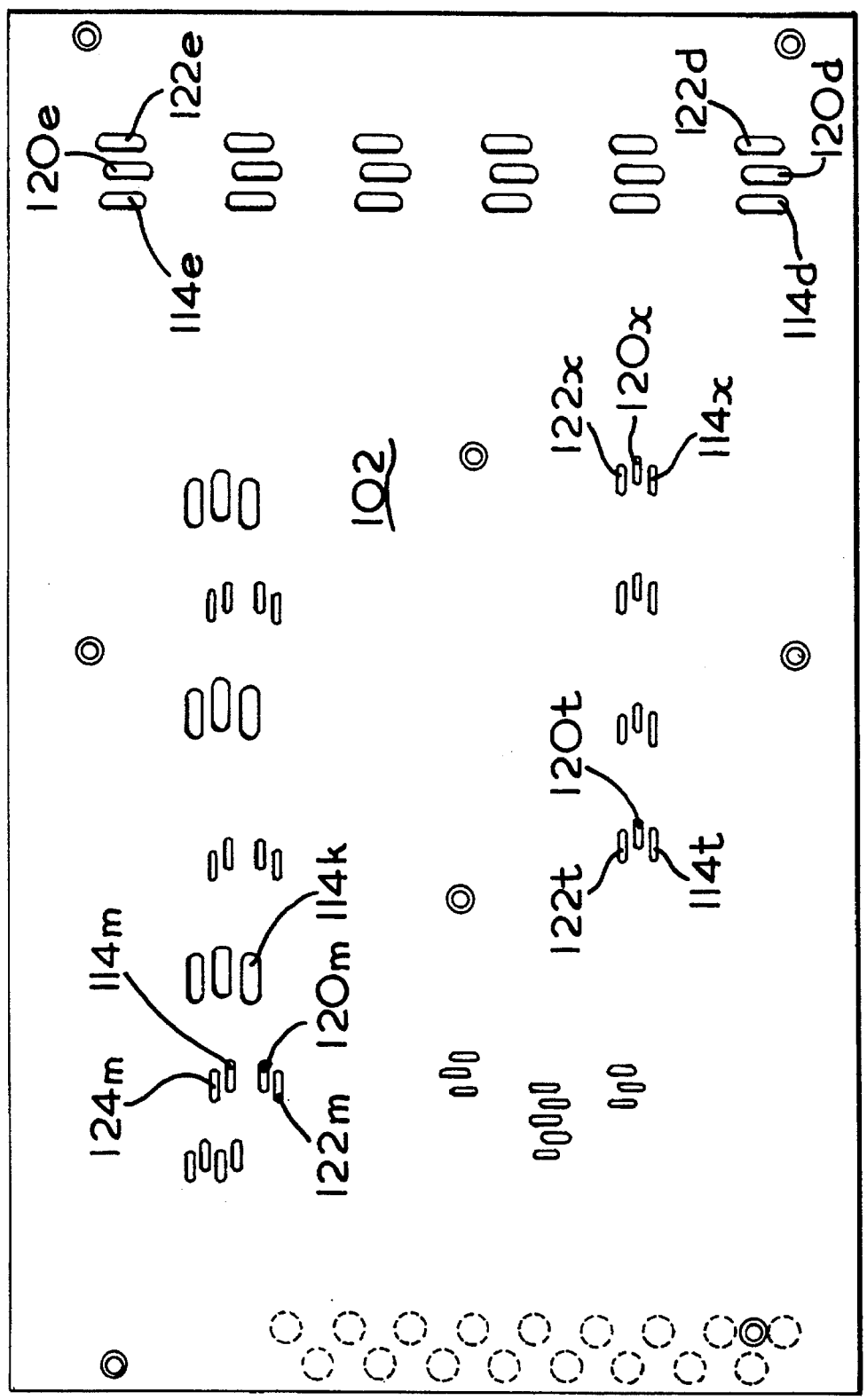
FIG. 11A shows a top view of the valve plate
Figure 12:
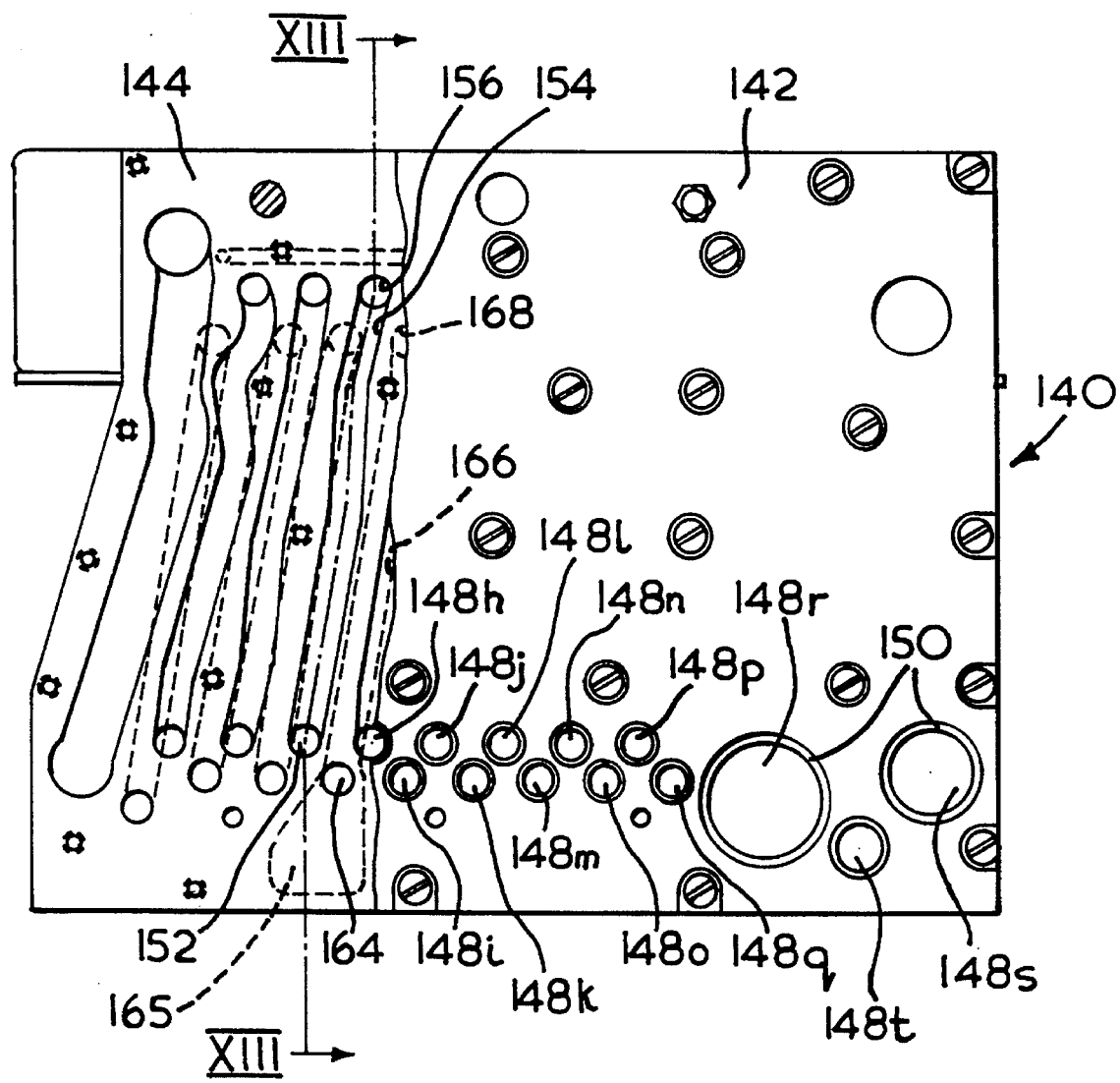
FIG. 12 shows a rear end view of a connector block of the piping module.
Figure 17:
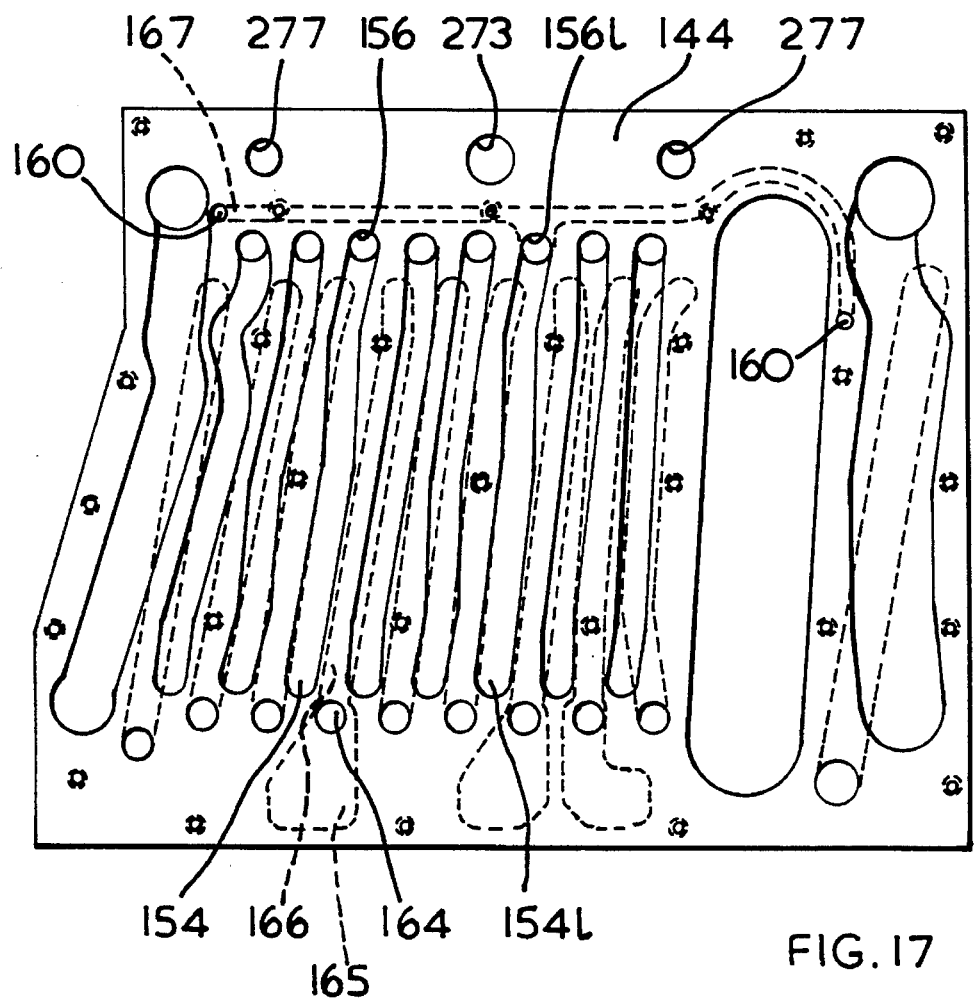
FIG. 17 shows a rear view of a center block of the connector block

The valve plate 102, (FIG. 11 and 11a) is provided on its underside with a pattern of grooves 104 which, when the plate 102 is assembled in position against the coverplate 96, provide a series of air passageways. Along a forward end of the valve plate 102 is an array of circular recesses 106, to each of which a groove 104 leads. When the valve plate 102 is in position on the cover plate 96, the recesses 106 mate with the holes 99 in the coverplate 96. These holes 99 lead to downward passages 108 (see FIG. 9) in the piping casting which lead to horizontal passages 110 opening to a series of exit ports 112 of the piping casting.

It is to be understood that the piping module PM is designed to receive air under pressure and vacuum (provided from the supply passages 10, through the shut off valve block 14 and the connector 58) and to provide a series of control pathways extending from the entry ports 62 in the rearward end wall 90 of the piping assembly to the exit ports 112 in the forward end wall 92 of the piping assembly. These control pathways include pressure control valves and on/off control valves as required to enable air to be supplied to the exit ports 112 at the required times and pressures to enable the operation of the pneumatically operated mechanisms of the section module SM.

While below certain only of these control pathways are described in detail, it may be noted at this stage that the various exit ports of the piping module carry air for the following operations.

| | |
|---|---|
| Exit port 112a | High Pressure Air |
| Exit port 112b | Plunger up (inner) |
| Exit port 112c | Plunger up (middle) |
| Exit port 112d | Plunger up (outer) |
| Exit port 112e | Vacuum on blowside |
| Exit port 112f | Plunger cooling (inner) |
| Exit port 112g | Vacuum on plungers (inner) |
| Exit port 112h | Plunger cooling middle |
| Exit port 112i | Spare |
| Exit port 112j | Spare |
| Exit port 112k | Spare |
| Exit port 112l | Flow reducer |
| Exit port 112m | Vacuum on plunger (middle) |
| Exit port 112n | Plunger cooling (outer) |
| Exit port 112o | Vacuum on plunger (outer) |
| Exit port 112p | Blowmould cooling on |
| Exit port 112q | Blowmould cooling off |
| Exit port 112r | Exhaust |
| Exit port 112s | Low Pressure Air |
| Exit port 112t | Vacuum |
| Exit port 112u | Pilot valve air |

As can be seen from FIG. 6, channel 78a extends directly from entry port 62a to exit port 112a, channel 78g extends directly from entry port 62g to exit port 112r and channel 78h extends directly from entry port 62h to exit port 112s. Each other exit port 112 is connected to its corresponding entry port 62 partly through the corresponding channel 78, and partly, through the grooves 104, by connection through supply connections provided by apertures in the upper wall 76, and holes 98 in the cover plate 96, and through valve connections provided by apertures 114 in the valve plate 102, to pressure regulating valves 116 and control valves 118 mounted on the valve plate 102.

The piping module PM comprises a distributor block 140 by which it may be connected to the section module SM [see FIGS. 12, 13, 16, 17, 18 and 19].

Figure 19:
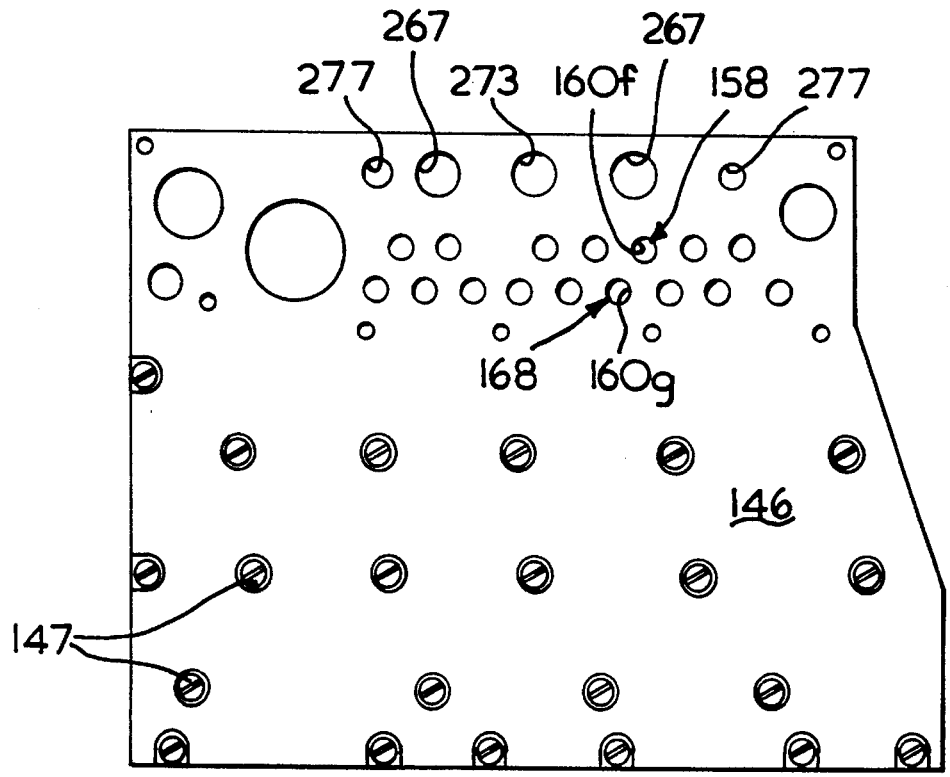
FIG. 19 shows a front view of a front plate of the connector block

The distributor block 140 comprises a rearward plate 142 (FIG. 18), a central block 144 (FIG. 17) and a forward plate 146 (FIG. 19). The plate 142 is secured to the block 144 by screws 143, the plate 146 is secured to the block 144 by screws 147. Gaskets 149 ensure an air tight seal between the block 144 and the plates 142 and 146.

The rearward plate 142 comprises a series of entry ports 148a . . . 148u for receiving the necessary air supplies and which correspond to and mate with the series of exit ports 112a–112u in the end wall 92 at the forward end of the piping assembly 64. An O ring 150 surrounds each of the entry ports 148, so that when the plate 142 is positioned against the end wall 92, the exit ports 112 are in airtight relationship with the entry ports 148.

In FIG. 13 two entry ports 148f and 148g are shown. The port 148f (shown in full line) leads to a bore 152 in the plate 142 which matches with a groove 154 formed in a rearward face of the central block 144. This groove 154 leads to a bore 156 extending through the block 144 which connects with a bore 158 in the forward plate 146 leading to an exit port 160f. The other entry port, 148g, shown in FIG. 12 in broken line leads to a bore 162 in the plate 142 which leads to a bore 164 extending to a recess 165 in the block 144. The recess 165 connects to a groove 166 formed in the forward face of the block 144 which leads to a bore 168 in the forward plate 146 leading to an exit port 160g.

It can be seen that the distributor block 140 is capable of providing a series of connecting paths, which may if necessary overlap, between the series of entry ports 148 and the series of exit ports 160. This series of paths is provided not, as is customary, by a series of pipes which have to be individually fitted and shaped and time consumingly assembled but by the central block 144, which may be manufactured by a straight forward machining operation, and assembled simply by securing the two plates 142, 146 and the block 144 together.

It should be noted that in the distribution block 140, entry port 148*l* leads, through a groove 154*l* in the block 144 (FIG. 17), to a bore 156*l* which leads to a transverse groove 167 in the forward face of the block 144, which leads to exit ports 160 in the plate 146. These provide pilot air for flow reduction valves (not shown) of a manual safety system.

The array of exit ports 160 in the distribution block 140 mate with a connector plate 282 (FIG. 16) which comprises a series of corresponding apertures 283.

The Section Module of the machine will now be described with special reference to FIGS. 21–31.

The Section Module comprises a box like section frame (FIGS. 22 and 23) made up of a base 170, a rear end wall 172, side walls 174, 176 and a top plate 178. The base 170 comprises two parallel box girders 180 (FIG. 24) (in which the wheels 11 are supported) joined by transverse members 182, 184. The forward member 184 is adapted to receive the bolt 17 by which the section module is located against the block 15, and provides the forward locating face 23.

The side walls 174, 176 are provided with integral air passages 186, (only some of which are shown) FIGS. 14 and 15 show the construction of the side wall 174—the side wall 176 is similarly constructed. The wall 174 is provided with a series of grooves 188 which lead from entry ports 190 in a rear end face of the side wall, progress horizontally along the sidewall; most of them then lead upwards to a top face 192 of the sidewall. The grooves 188 are closed by a gasket 194 and a side plate 196 to provide air tight air passages 186. FIG. 14 shows one of the passages 186 which leads to an exit port 238 on an upper surface 236 of the top plate 178—the passage 186 leads to a short vertical bore 198 which opens onto the top face 192 of the sidewall. The top plate 178 comprises a short vertical bore 230 which opens to a horizontal bore 232 which in turn leads to a short vertical bore 234 which opens into the exit port 238 on the upper surface 236 of the top plate 178. FIG. 15 shows another of the passages 186 which leads to an exit port 240 on an under surface 242 of the top plate 178. This passage 186 opens to a short vertical bore 244 which leads to the top surface 192 of the side wall. The top plate 178 comprises a short vertical bore 246 which opens to a horizontal bore 248 which in turn leads to a short vertical bore 250 which opens into the exit port 240 on the lower surface 242 of the top plate and is connected to a pipe 254. O rings 252 around the various exit ports provide for appropriate air tight sealing.

The top plate 178 comprises openings designed to accept the various mechanisms of the section module, a number of exit ports for the operating air to operate such mechanisms and openings through which cooling air can be supplied. The openings in the top plate 178 comprise two openings 255, adapted to receive operating shafts of the blank mould opening and closing mechanisms, an opening 256 adapted to receive plunger mechanisms, an opening 258, adapted to receive a baffle mechanism, an opening 260 adapted to receive a funnel mechanism, an opening 262 adapted to receive an invert/revert mechanism, two openings 264 adapted to receive operating shafts of a blowmould opening and closing mechanism, an opening 265 adapted to receive the blow mould cooling mechanism, an opening 266 adapted to receive a takeout mechanism and an opening 268 adapted to receive a blowhead mechanism. The top plate 178 also comprises two openings 257 for the supply of cooling air to the blank mould mechanism, and an opening 259 leading to a cullet chute to accept parisons which for some reason have to be rejected rather than passed to the blow mould mechanisms.

Air is supplied to the various passages 186 (individually indicated as 201–223) in the walls 174 and 176 from a valve block 280 which is mounted on the rear of the section module.

The valve block 280 is connected to the high pressure air, low pressure air, pilot air and exhaust ports (112*a*, 112*s* 112*r* and 112*h*) of the piping module, and provides a supply of controlled operating air to the various pneumatically controlled mechanisms. In general, operating air is provided through the valve block 280 when the facility to adjust the pressure of the operating air during operation of the section module is required: as will appear later, the valve block comprises a series of restrictor valves which are arranged for easy adjustment by the operator.

Figure 16:
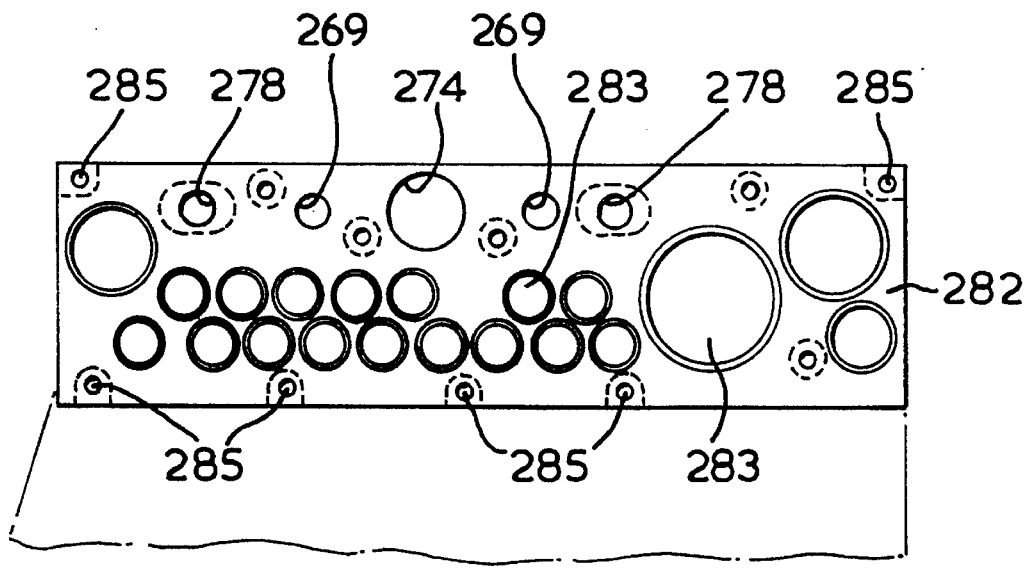
FIG. 16 shows a rear view of a connecting plate of the piping module
Figure 16A:
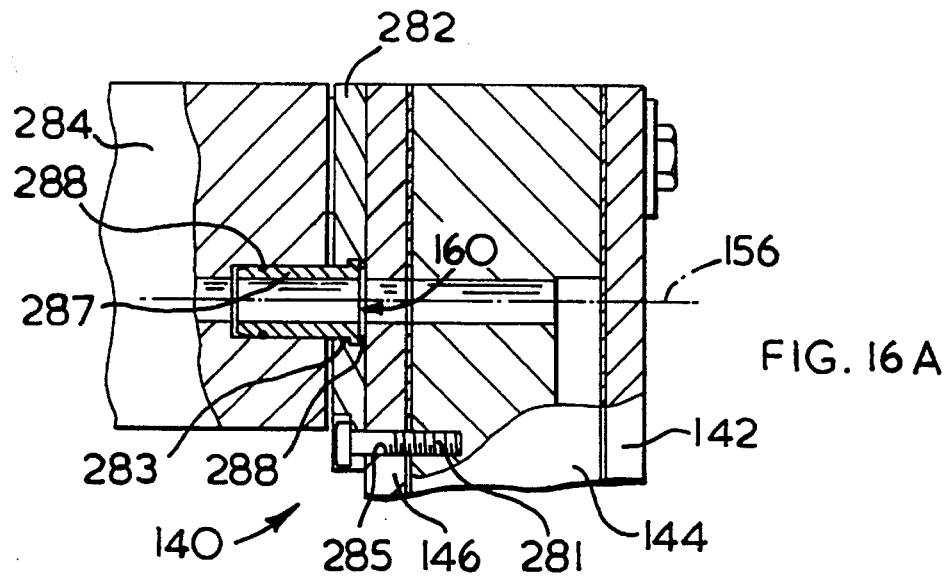
FIG. 16A, 16B and 16C show details of the interconnection between the connector block, the connecting plate and a piping block of the section module
Figure 16B:
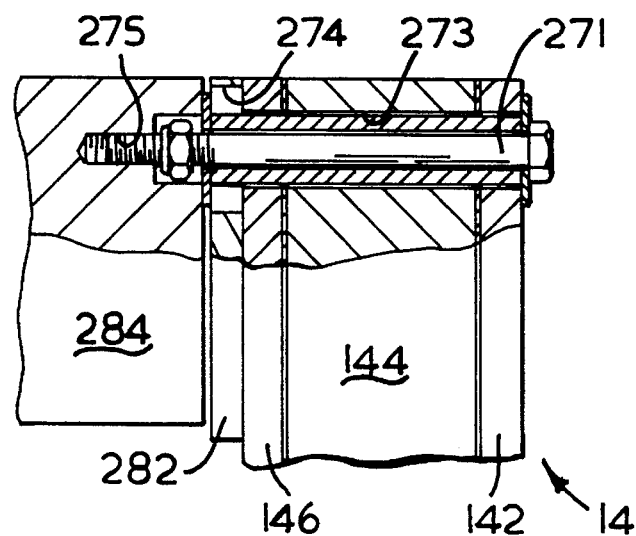
Figure 16C:
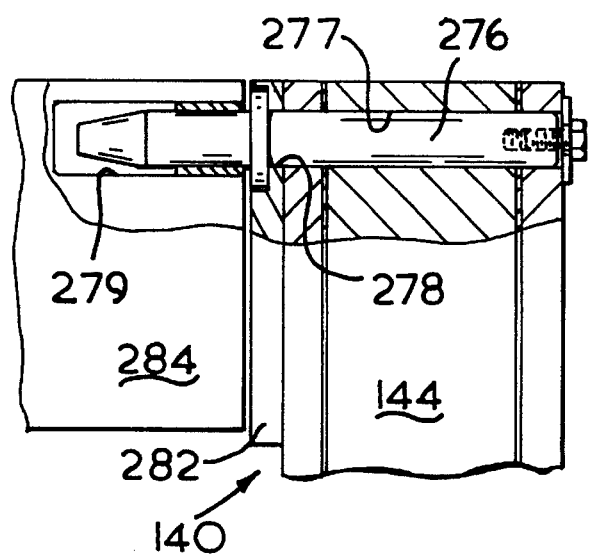
Figure 18:
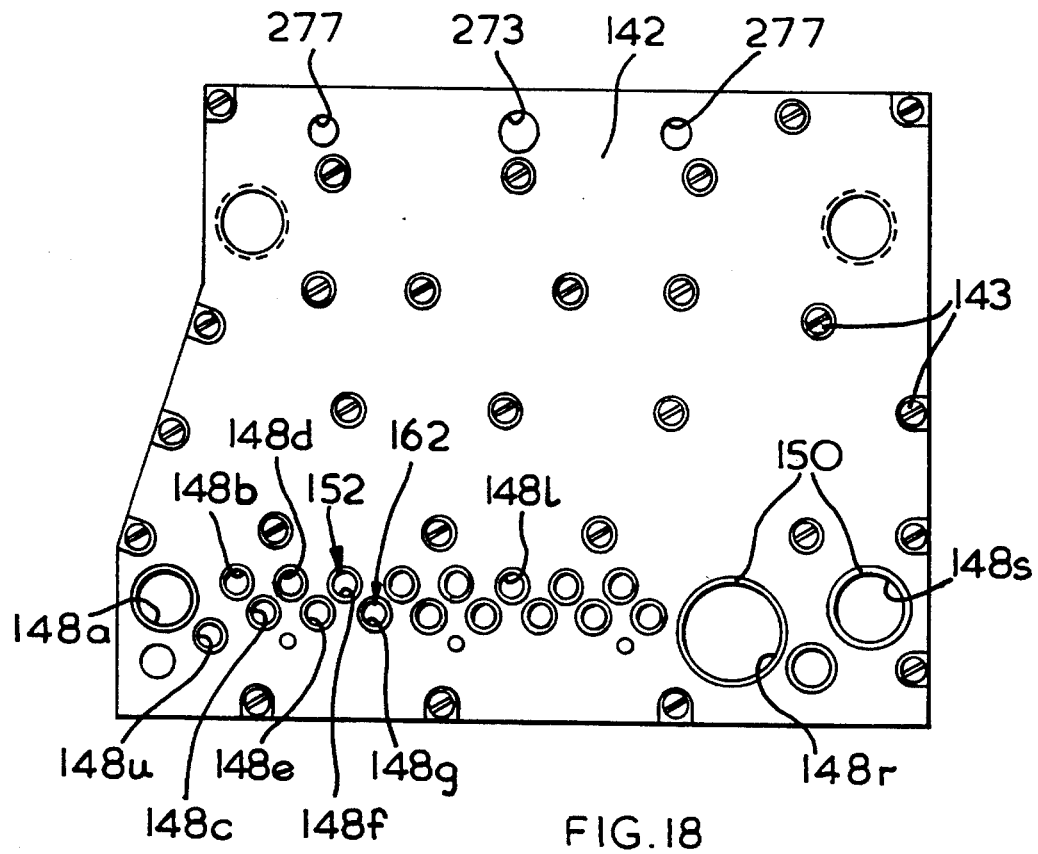
FIG. 18 shows a rear view of a rear plate of the connector block

As has already been described air from the exit ports 112*a*–112*u* is supplied through the distributor block 140 to the exit ports 160. The connector plate 282 is secured to the distributor block 140 by bolts 281 extending through holes 285 in the connector plate 282 (see FIG. 16A) and opposite each exit port 160 in the block 140 the plate 282 supports a floating bushing 287 mounted in apertures 283 in the plate 282, O rings 288 associated with the bushing providing for air tight seals.

A piping block 284 having a series of entry ports 272 is secured to the rear end wall 172 of the section module SM. The piping module PM and the Section module SM are secured together when the modules are both in their operative position by a captive bolt 271 which passes through a hole 273 in the block 140, and a hole 274 in the plate 282 and is screwed into a threaded bore 275 in the piping block 284 (see FIG. 2A). Location is assisted by two dowels 276 rigidly secured in holes 277 in the block 140 and 278 in the plate 282 and extending into a sleeved locating holes 279 in the piping block 284. Supported in holes 267 in the forward plate 146 and 269 in the connecting plate 282 are spring urged plungers (not shown) which serve not only to determine the desired spacing between the plate 282 and the piping block 284 when they are secured together, but also assist in obtaining separation between the piping block 284 and the connecting plate 282 when the piping module PM is to be separated from the section module SM.

When the piping module PM is thus secured in its operative position, the floating bushings 287 make for airtight connection between the exit ports 160 of the distributor block 140 and the entry ports 272 of the piping block 284. The piping block 284 comprises exit ports 296 *b,c,d, f,g,h,n,m,o*, (not individually shown) which convey the plunger up air, vacuum on air and plunger cooling air from the corresponding exit ports 112 of the piping module, to flexible pipes 290 which lead through the section to plunger mechanisms of the section module.

The exit ports 296*e*, 296*p* and 296*q*, (which provide respectively air for Vacuum on blowside, Blowmould cooling on, blowmould cooling off) are connected to pipes, not shown, which run through the lower part of the section frame to the appropriate mechanisms or valves of the mechanisms. Exit port 296*l* is connected to the flow reducer valves (not shown but previously mentioned). Exit port 296*t*, which conveys the vacuum, is connected to the hollow interior of the right hand box girder 180 (see FIG. 24) from which it is led, as required, by flexible pipes to the various mechanisms.

The piping block 284 comprises three vertical bores 298, 300, 302, 304 which communicate respectively with entry port 272a (high pressure air) 272u (pilot air) 272r (exhaust) and 272s (low pressure air). These bores open into an upper surface 306 of the piping block 284 and respectively receive, in air tight relation sealed with O rings, vertical pipes 308, 310, 312 and 314. A casting 316 of the valve block 280 is secured to the front plate 172 by bolts 318 (FIG. 25), and comprises downwardly extending lugs 320, 324 which are provided with bores 326a, 326u, 326r and 326s which are adapted to receive, in airtight relation, upper end portions of the pipes 308, 310, 312 and 314.

The valve block 280 is best shown in FIGS. 26–31.

The bores 326a, 326u, 326r and 326s of the casting 316 are, as already explained connected to supplies of high pressure air, pilot air, exhaust and low pressure air respectively. A rearward face 428 of the casting 316 is provided with a series of semi circular ports arranged in pairs, upper ports 430 of each pair being connected to the high pressure air and lower ports 432 of each pair being connected to low pressure air. Adjacent to each pair of ports is a valve outlet 434, and each valve outlet 434 is connected to a passageway 436 in the casting 316, each of the passageways 436 leading transversely through the casting to one of a series of forwardly facing exit ports 438 arranged vertically at opposite edge portions of the casting which mate with the entry ports 190 of the passages 186.

Figure 28:
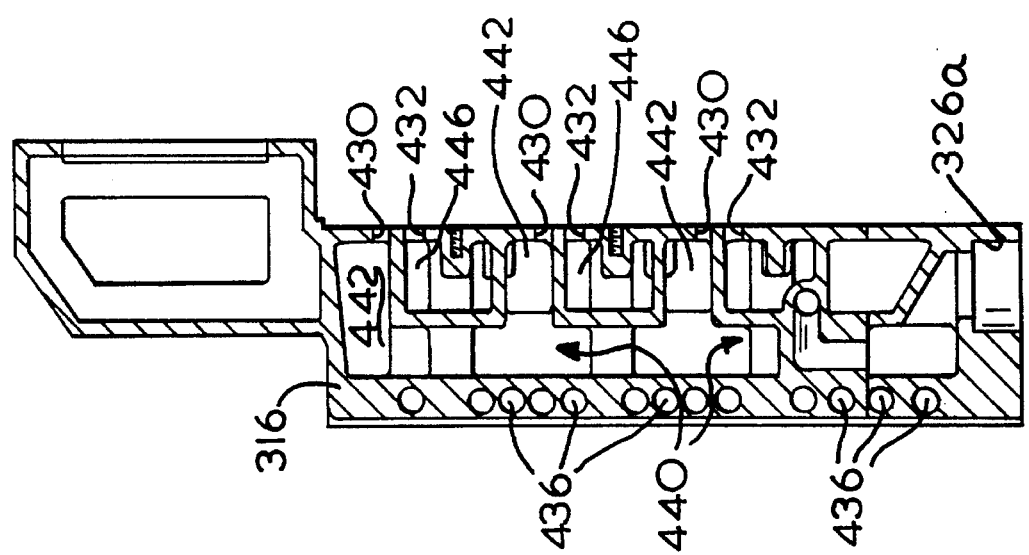
FIG. 28 shows a view in section along the line XXVIII—XXVIII of FIG. 26

The high pressure air enters the casting through the bore 326a, and passes through an upwardly extending channel 440 and transversely extending channels 442 to the ports 430 (FIG. 28).

Figure 29:
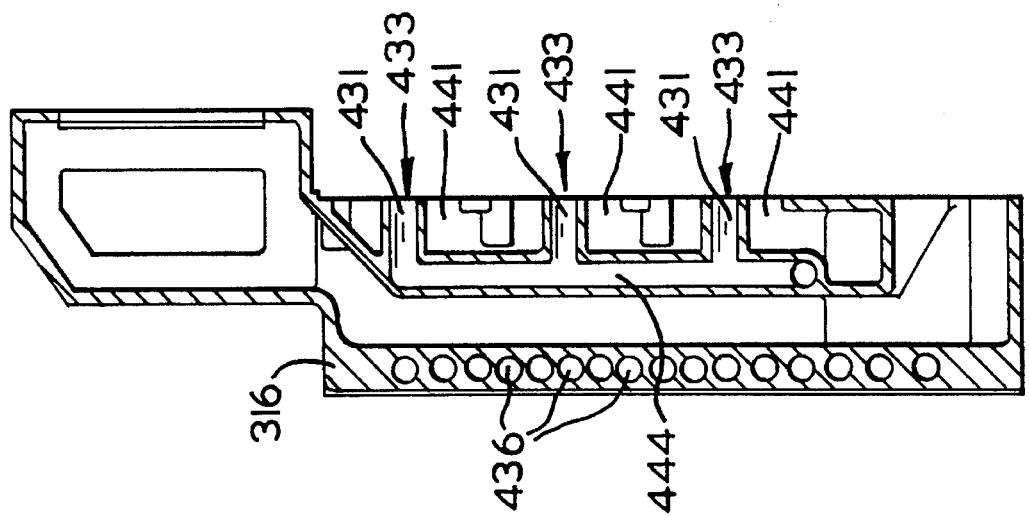
FIG. 29 shows a view in section along the line XXIX—XXIX of FIG. 26

The pilot air enters the casting through the bore 326u and is led to an upwardly extending pipe 444 which is connected to three rearwardly extending pipes 431 to outlet ports 433. (FIG. 29)

Figure 27:
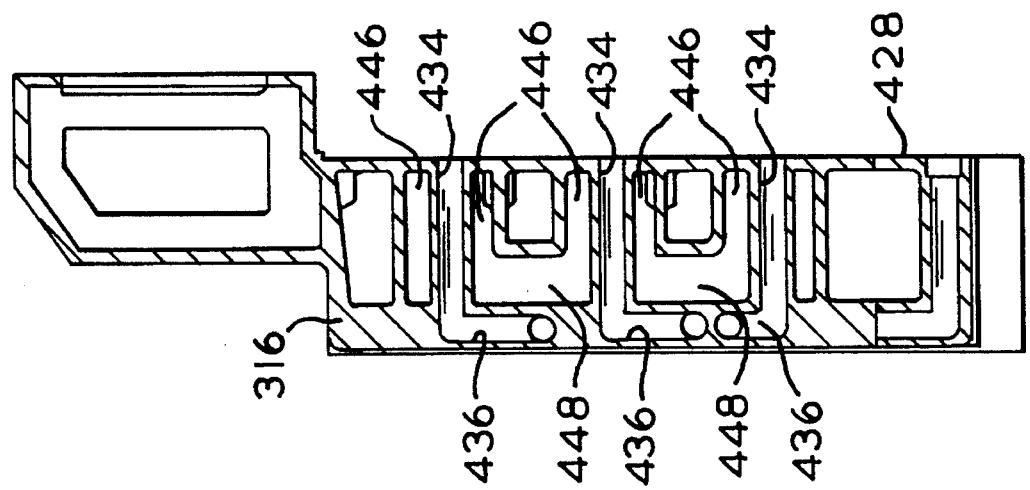
FIG. 27 shows a view in section along the line XXVII—XXVII of FIG. 26
Figure 29:
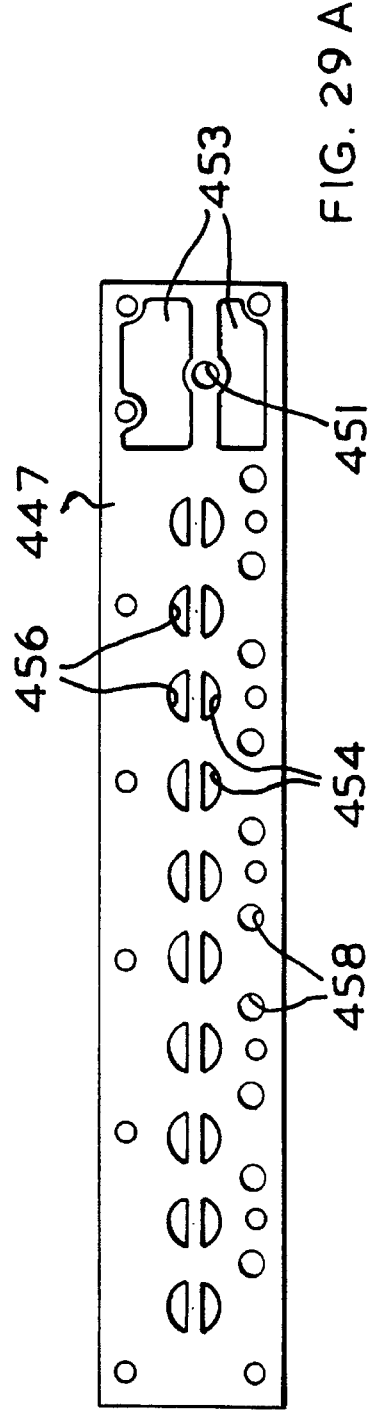

The low pressure air enters the casting 316 through the bore 326s and passes upwardly into a lowest of three transverse channels 446 which are interconnected by an upwardly extending channel 448 (see FIG. 27). The ports 432 all open into the transverse channels 466.

The exhaust is connected to the casting 316 through the bore 326r which connects to a transverse passage 437 which leads to an upwardly extending channel 439 which surrounds the pipe 444. Exit apertures 441 in a rearward face of the casting 316 open into the channel 439.

Figure 30:
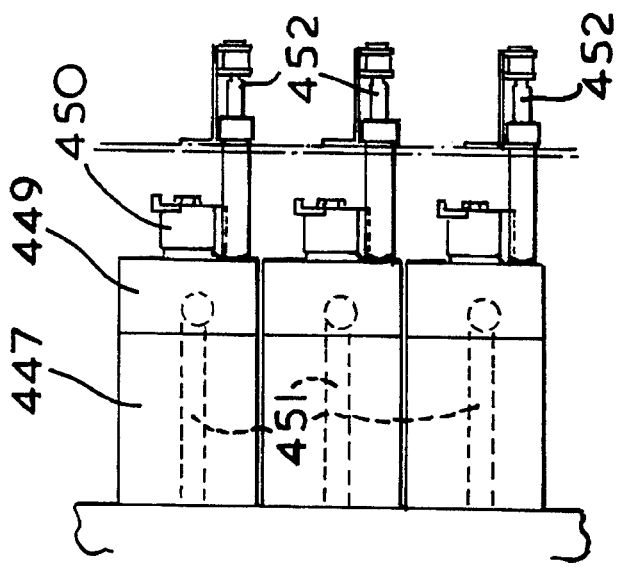
FIG. 30 shows a diagrammatic side view of three housing blocks, valve plates and valves secured to the valve plates

The valve block 280 comprises three housing blocks 447 which are secured to the face 428 of the casting 316 (FIGS. 29A & 30). Each housing block 447 comprises a passageway 451, which mates with an outlet port 433 for pilot air, two exhaust passageways 453 453, which mate with exit apertures 441, a series of semicircular low pressure passageways 454, which mate with the low pressure ports 432, a series of semi circular high pressure passageways 456, which mate with the high pressure ports 430, and a series of outlet passageways 458, which mate with the valve outlets 434.

Figure 31:
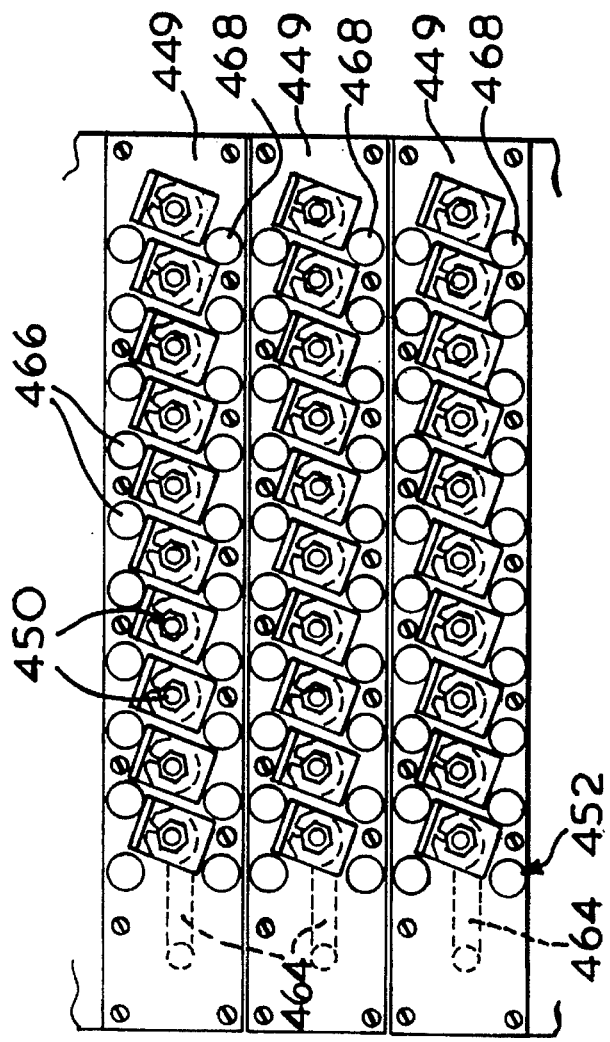
FIG. 31 shows a rear view of valve plates with various valves in position

Secured to each of the housing blocks 447 is a valve plate 449 (FIGS. 30, 31). Each plate 449 supports a series of electrically controlled valves 450 which as desired may be connected to the high pressure air (through passageways 456) low pressure air (through the passageways 454), pilot air (through the passageway 451 which leads to a transverse passageway 464 in the plate 449). An upper series of holes 466 in the plate 449 may be provided with check valves, a lower series of holes 468 may be provided with hand adjustable flow restrictors 452. Thus each valve 450 may be connected to such air supplies and exhaust as may be desired, and can be caused to operate to supply air of the required timing and pressure to the valve outlets 434 in the casting 361 and thence to the necessary mechanisms in the section module.

In FIGS. 20A–20F part of the pneumatic circuitry of the machine is shown, as arranged for narrow neck press and blow operation. The circuitry can readily be adapted if desired for blow and blow operation.

The chain dot line in FIGS. 20A–20F surrounds those items of the pneumatic circuitry which are present in the piping module PM: the items of the circuitry not present in the piping module are, for the most part, situated in the valve block 280.

The pneumatic circuitry will not be described in detail, but its construction will be understood from the following. It comprises a number of subcircuits for operating the mechanisms; the subcircuit for the blank mould close and open is shown at 336 in FIG. 20A. A piston and cylinder device 338, which operates the blank mould close and open in a conventional manner, is connected by the passage 201 in the side wall, through a safety valve 340, a restrictor 342 (one of the flow restrictors 452 in the valve block) and an electrically controlled valve 344 (one of the valves 450 in the valve block) to the exhaust and to the high pressure supply. The device 338 is also connected by the passage 202 in the side wall 76, through another safety valve 340, a restrictor 346 (452 in the valve block) and an electrically controlled valve 348 (450 in the valve block) to the exhaust and to the low pressure supply. The restrictor valves 340 and the electrically controlled valves 344 and 348 are incorporated in the valve block 280 and are connected to the high pressure supply, the low pressure supply and exhaust in the manner described above. It will readily be understood that, once the safety valves 340 have been actuated to put them into an active position (where air may pass through them), appropriate actuation of the valves 344 and 348 at the correct time by the electronic control system of the machine will cause high pressure air to be supplied to the device 338, to close the blank moulds, and low pressure air to be supplied to the device 338, to open the blank moulds.

The safety valves 340 (which are incorporated in a number of the subcircuits) are to ensure that the associated mechanism cannot be accidentally moved and, when the machine is in operation, are locked in open position.

In the various subcircuits, the related passage in the walls 174, 176 of the machine frame are indicated.

Figure 20:
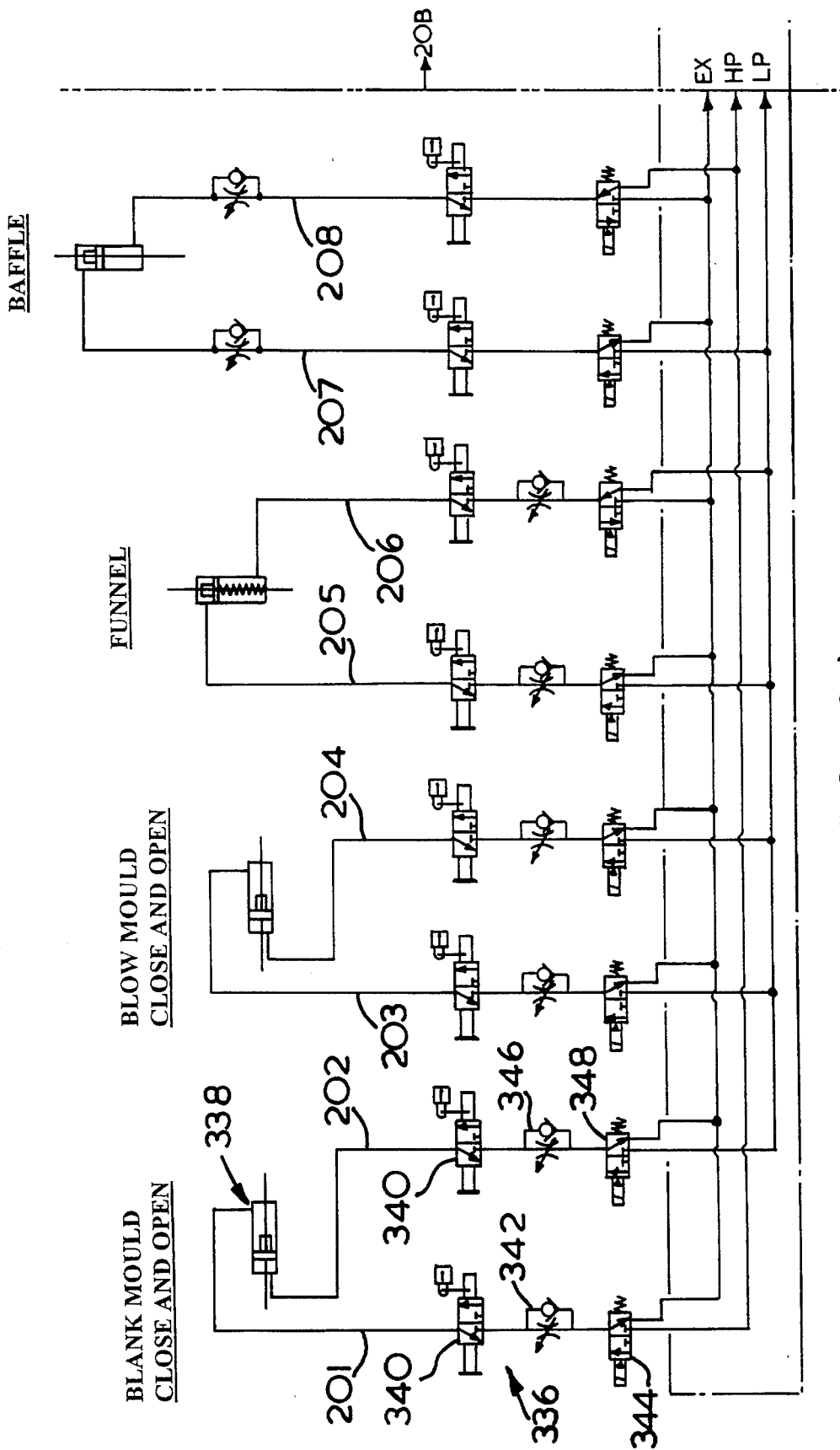
FIGS. 20A–20F show diagrammatically pneumatic circuitry of the section
Figure 20B:
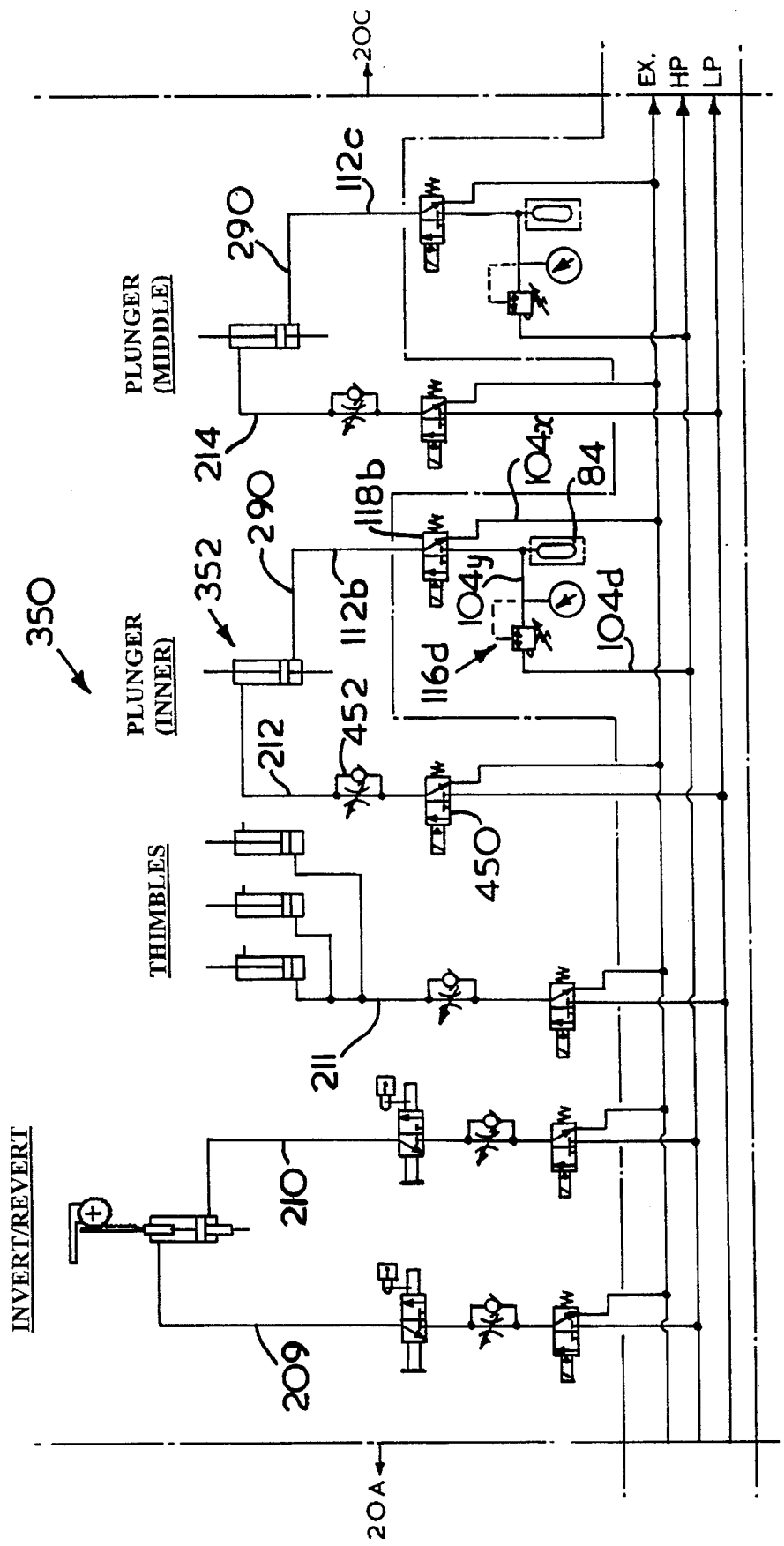

The subcircuit for operating the inner plunger is shown at 350 in FIG. 20B. It comprises a piston and cylinder device 352 one side of which is connected through one of the hoses 290, through exit port 296b and entry port 272b in the piping block 284 to exit port 112b of the piping module, and then through a control pathway in the piping module.

The control pathway through the piping module will now be described. Plunger up air is supplied to the piping module through entry port 62d to the channel 78d. Opening into the channel 78d is an aperture 100d (see FIG. 6), and this is connected, through a hole 98d in the cover plate 96 to an initial groove 104d in the valve plate 102. The groove 104d leads to a valve aperture 114d in the valve plate 102, which is positioned alongside second and third valve apertures 120d and 122d. Connected across the three valve apertures 114d, 120d and 122d outside the valve plate is a pressure regulating valve 116d. The aperture 122d leads to a groove 104z which connects to the exhaust channel 78g through a hole 98g in the cover plate 96 and the aperture 100g in the casting 66. The aperture 120d leads to an intermediate groove 104y which leads through a hole 98y in the cover plate 96, to an aperture 100y in the casting 66 which leads into the reservoir 84. A further aperture 100x leads from the reservoir 84, through an aperture 98x in the cover plate 96 to a second intermediate groove 104x which leads to a valve aperture 114x in the valve plate 102. This valve aperture 114x is positioned alongside two further valve apertures 120x and 122x in the valve plate 102. The aperture 122x leads to an extension of the groove 104z leading to exhaust. The aperture 120x leads to a final groove 104w which leads to a recess 106w which leads, as previously described to the exit port 112b. An electrically operated on off control valve 118b is positioned on the valve plate and is connected to the three passageways, 114x, 102x and 122x.

It can thus be seen that a control pathway is thus provided through the piping assembly which comprises (a) the air channel 78d leading from the entry port 62d;

(b) a supply connection provided by the apertures 100d and 98d between the air; channel and the initial air passageway provided by the initial groove 104d;

(c) the initial air passageway;

(d) a first valve connection provided by the valve aperture 114d between the initial air passageway and an inlet of the pressure control valve 116d;

(e) the valve 116d;

(f) a second valve connection provided by the valve aperture 120d between an exit of the pressure control valve 116d and an intermediate air passageway provided by the groove 104y;

(g) the intermediate air passageway;

(h) a supply connection provided by the apertures 98y and 100y between the intermediate air passageway and the air reservoir 84

(i) a supply connection between the air reservoir 84 and the second intermediate air passageway (groove 104x) and 98x;

(j) the second intermediate air passageway;

(k) a third valve connection provided by the aperture 114x between the second intermediate air passageway and the on-off control valve 118b;

(l) the on-off control valve 118b;

(m) a fourth valve connection provided by the aperture 120x between the control valve and a final air passageway provided by the final groove 104w;

(n) the final air passageway;

(o) a supply connection provided by the recess 106w, aperture 99 in the cover plate 96, downward passage 108 and horizontal passageway 110 in the end wall 92 leading to the exit port 112b.

The other side of the piston and cylinder device 352 is connected through the passageway 212 in the wall 174 to a flow restrictor 452 and a control valve 450 in the valve block 280 and thence as previously described, both to the low pressure air supply and to exhaust.

It will be understood that while the control pathway just described comprises a connection from the intermediate air passageway into the reservoir 84 and another connection from the reservoir to the second intermediate air passageway, it would be possible to have the intermediate passageway extend from the exit of the pressure control valve 116a to the valve connection to the on-off control valve 118b, and merely have a supply connection part way along the intermediate passageway which is connected to the reservoir.

A control pathway through the piping module which does not include a pressure control valve is provided to supply pilot air to control the provision of vacuum to the blow moulds of the section module. The subcircuit for this is shown at 354 in FIG. 20F. An on/off control valve 356 is provided at the blow mould cooling mechanism, and is connected to the vacuum supply in the girder 180 through a hose (not shown), the entry port 272t in the piping block 284 the exit port 112t of the piping module, and the channel 78f which carries the vacuum through a passageway provided by a groove 104f in the valve plate in a manner that will now be understood.

The valve 356 is operated by pilot air which is provided in the following manner. A groove 104t is provided in the valve plate 102 and is connected, through a supply connection comprising aperture 98b in the cover plate 96 and 100b in the casting 66 to the channel 78b which carries pilot air.

The groove 104t is connected to a valve aperture 114t, which lies alongside further valve apertures 120t and 122t. Aperture 122t is connected to exhaust through an extension of groove 104z. Aperture 120t is connected to a final groove 104s which leads, in a manner similar to that already described, to the outlet port 112e. An electrically operated control valve 118t is positioned across the three valve apertures 114t, 120t and 122t.

Certain of the control pathways may be used for one purpose in one mode of operation of the machine and for another in another mode. For example, the control pathway for plunger cooling (in NNPB)(FIG. 20D) shares components with that for blank side vacuum and counter blow (Blow and Blow).

The channel 78e which carries plunger cooling air is connected through the aperture 100e to a groove 104e in the valve plate 102 which leads to a valve connection 114e, to which a pressure regulator valve 116e is connected, other ports of the valve 116e leading to a valve connection 122e, which is connected to exhaust, and another valve connection 120e which leads to a further, intermediate groove 104k. This leads to a valve connection 114k, to which an electrically operated control valve 118k is connected, other ports of the valve 118k leading to a final groove 104l which leads, in a manner which will be understood from the earlier description, to outlet port 112n of the piping module, and to a groove 104m which leads to a further valve connection 114m. An electrically operated control valve 118m is connected to the connection 114m and to further valve connection 120m, 122m and 124m. The connection 120m leads to a groove 104n which leads to the outlet port 112o, the connection 122m to the groove 104f which is connected to vacuum, and the connection 124m leads to exhaust.

Figure 20D:
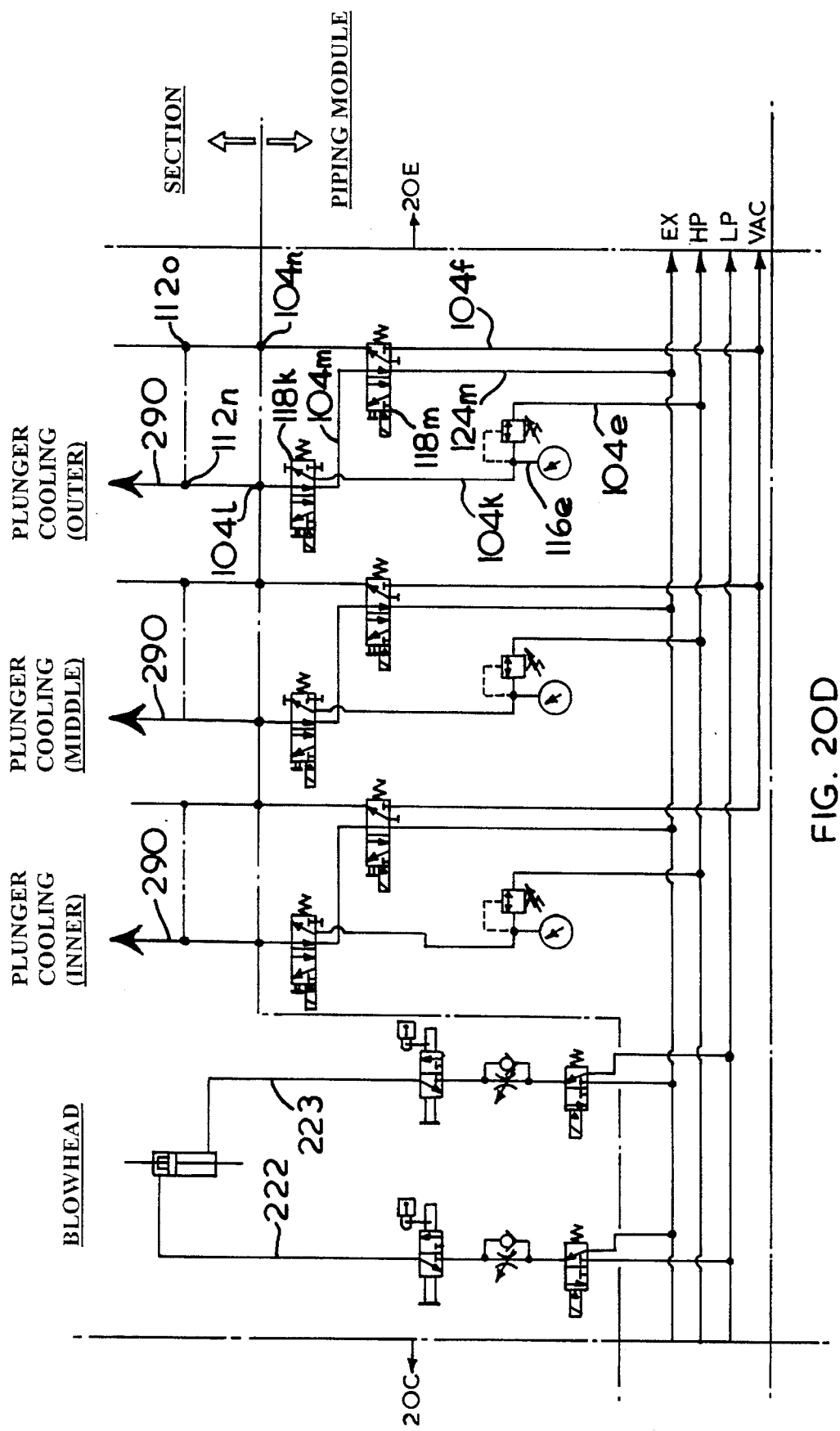
Figure 20E:
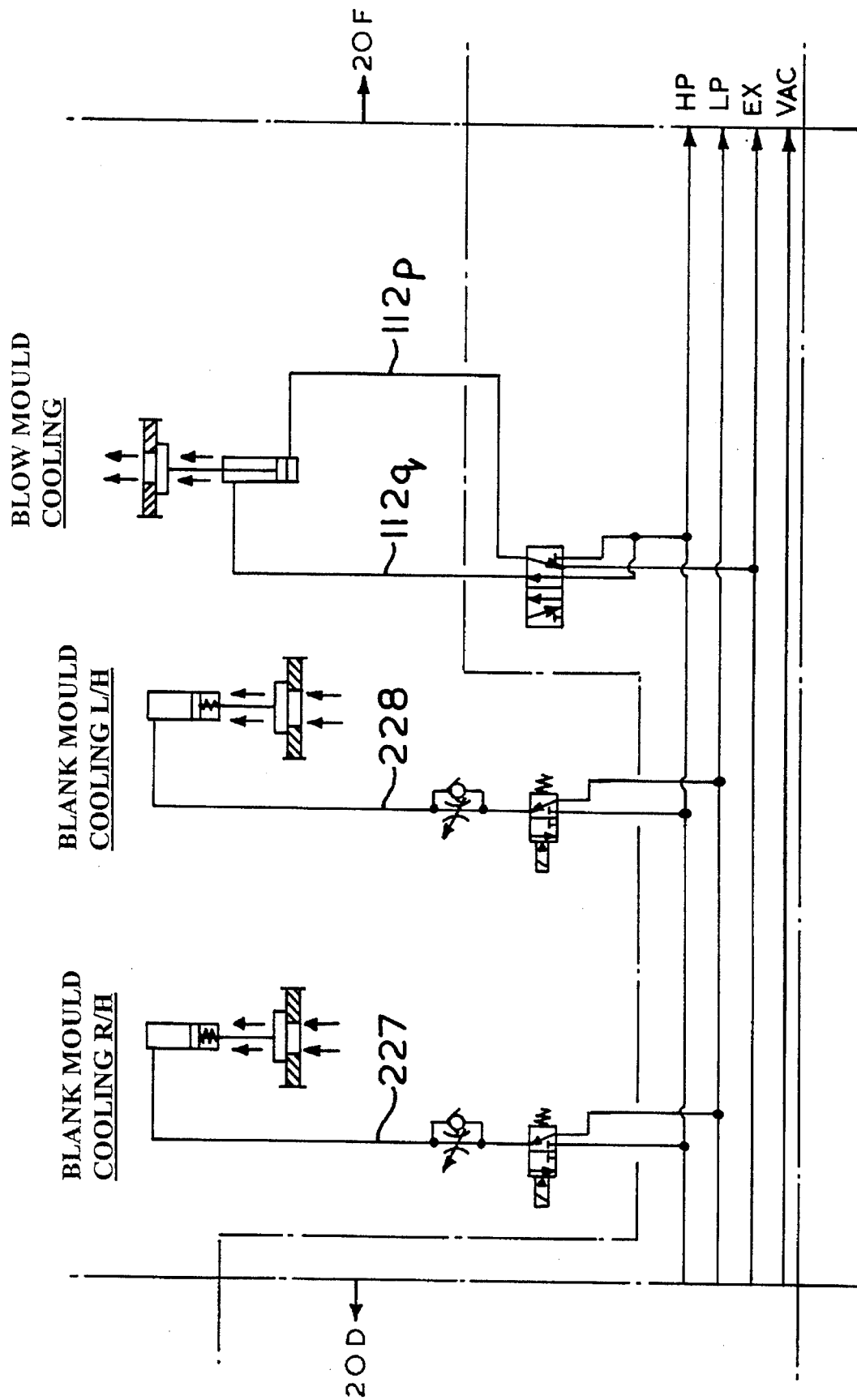
Figure 20F:
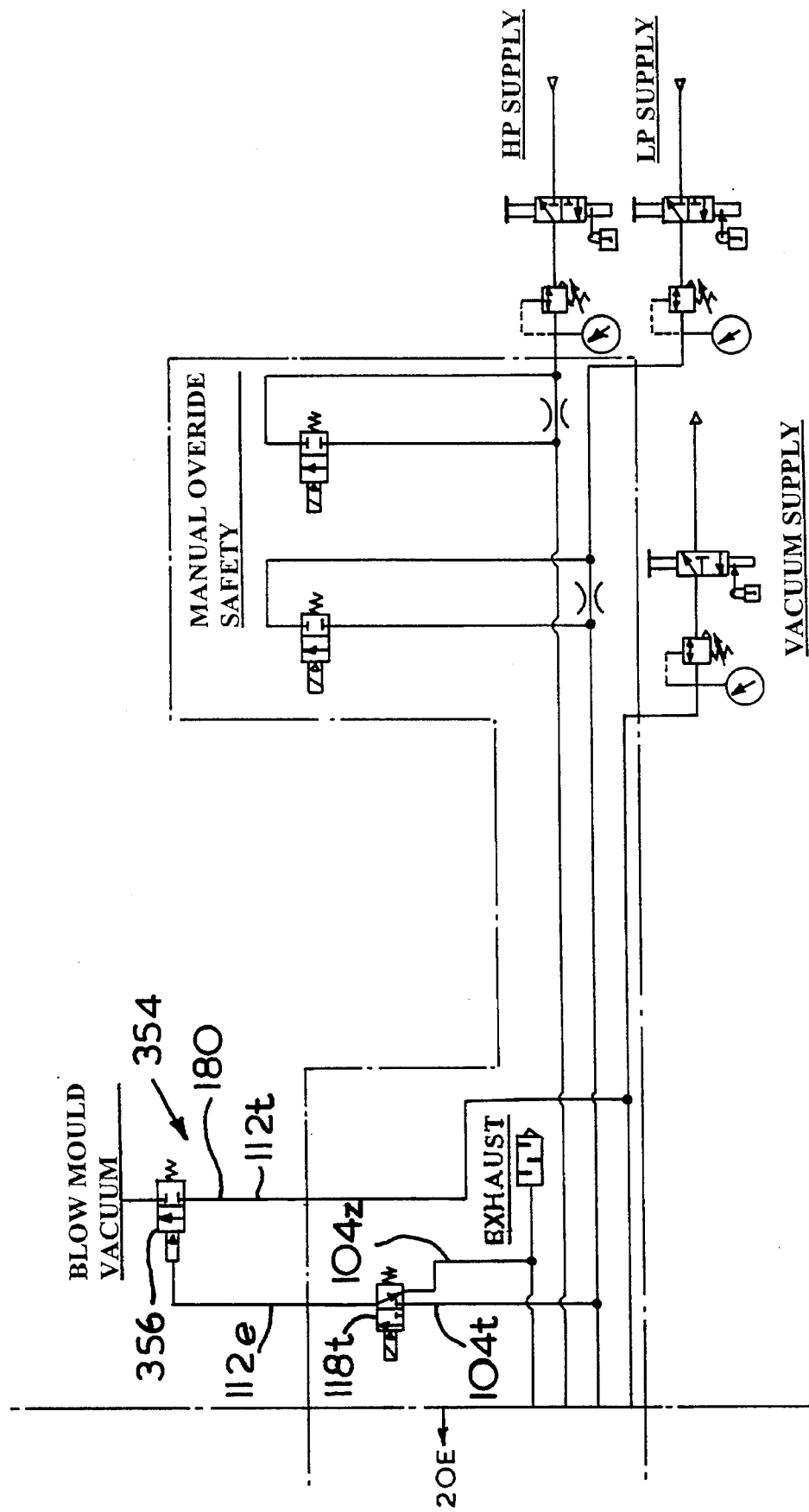
Figure 21:
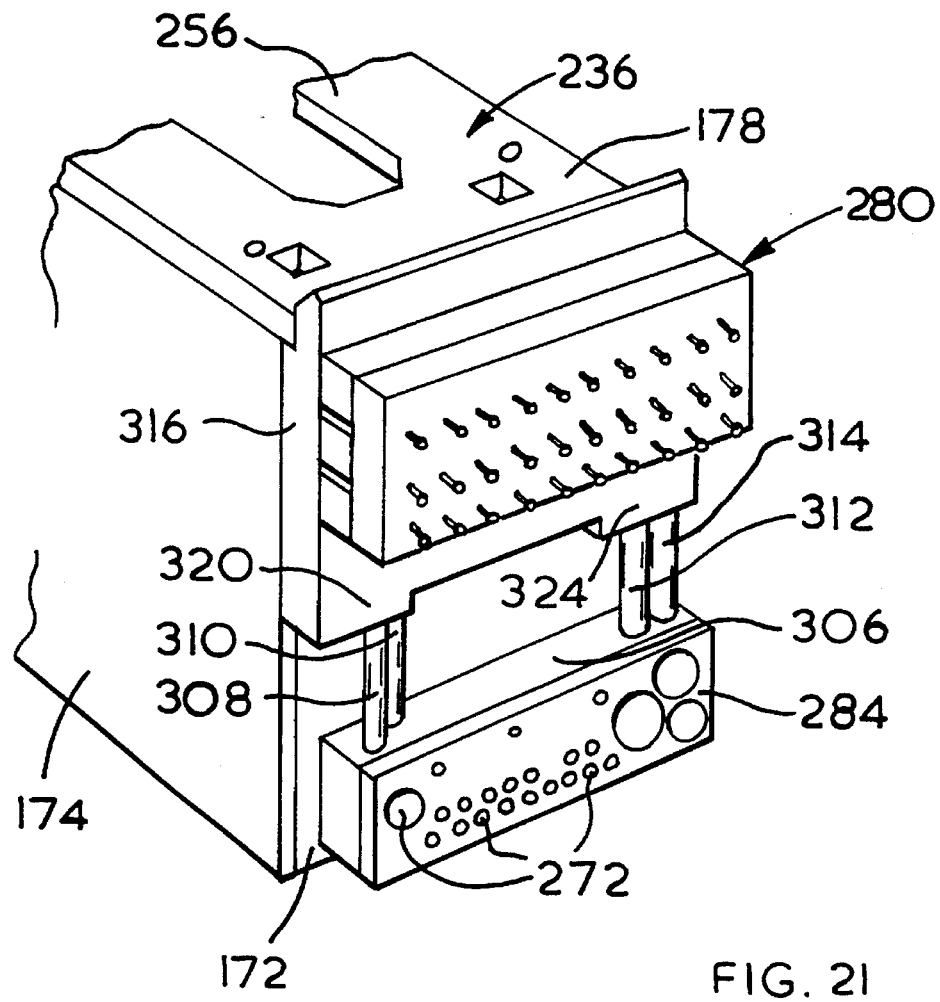
FIG. 21 shows a rear perspective view, partly broken away, of the section module
Figure 25:
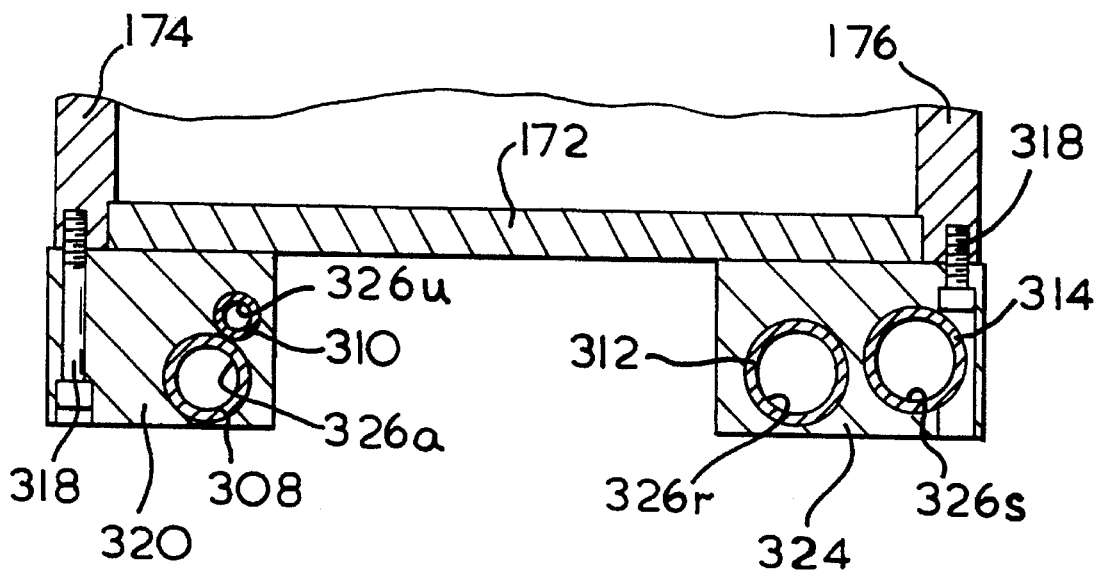
FIG. 25 shows a view in section taken along the line XXV—XXV of FIG. 24
Figure 22:
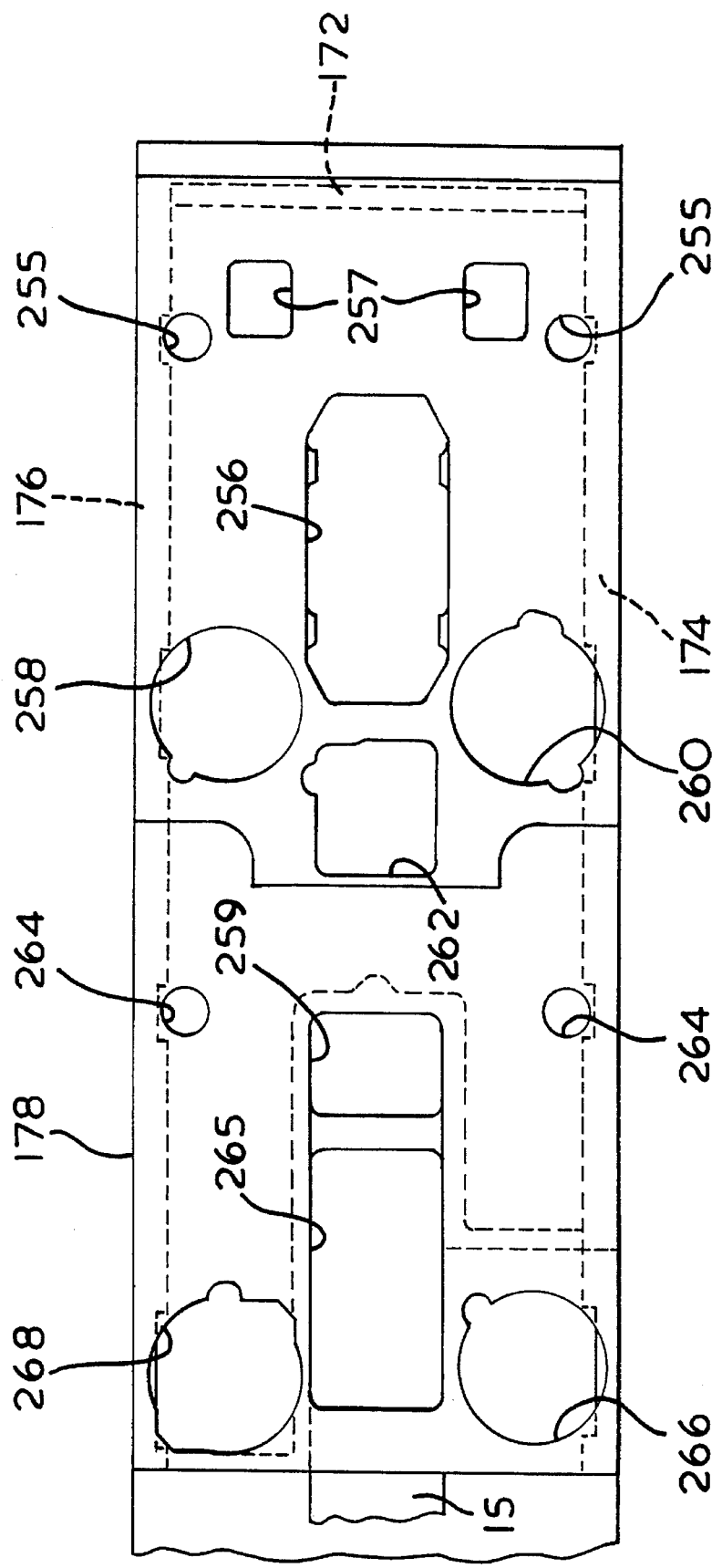
FIG. 22 shows a plan view of a top plate of the section module
Figure 23:
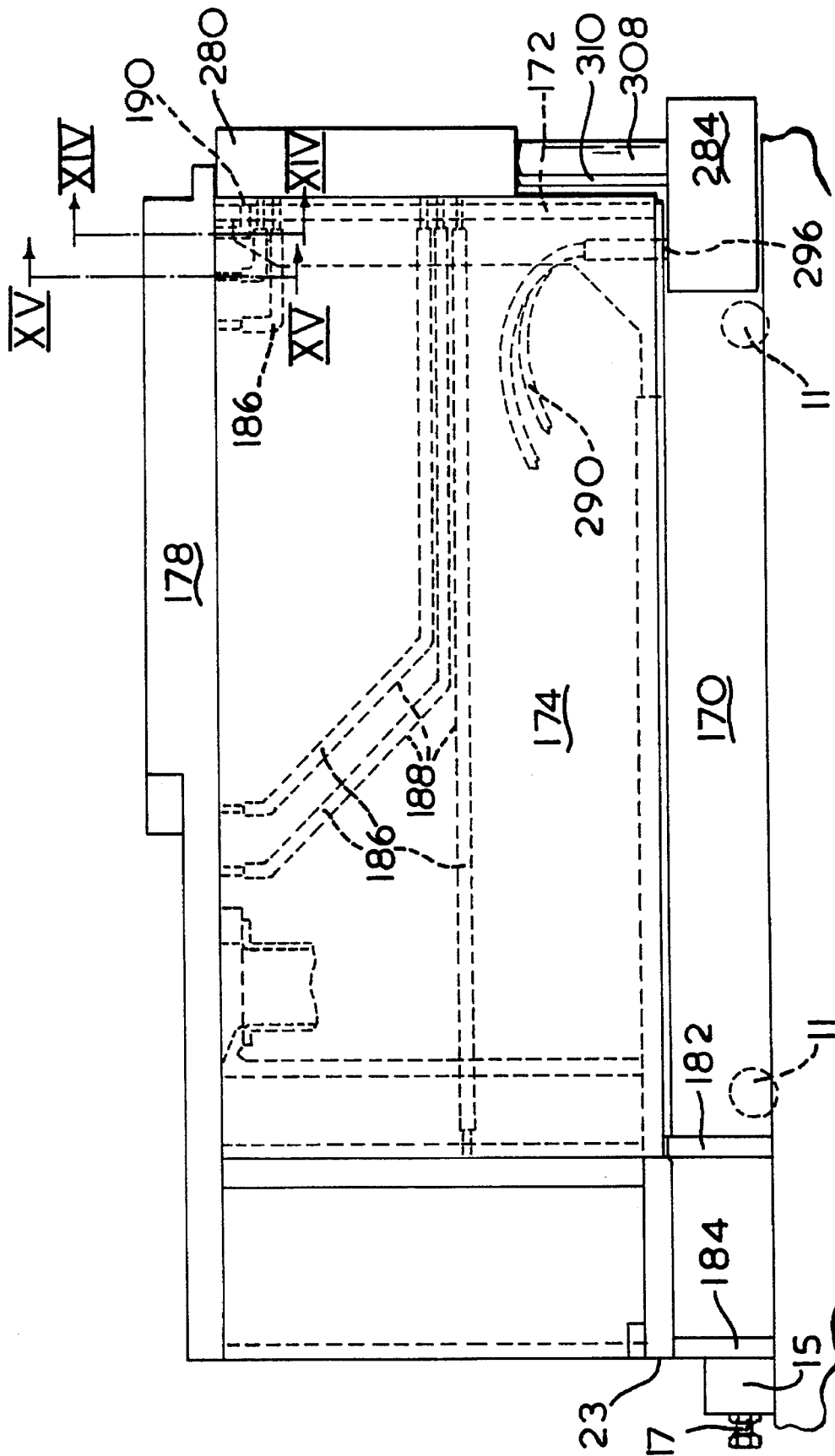
FIG. 23 shows a side view of a frame of the section module
Figure 24:
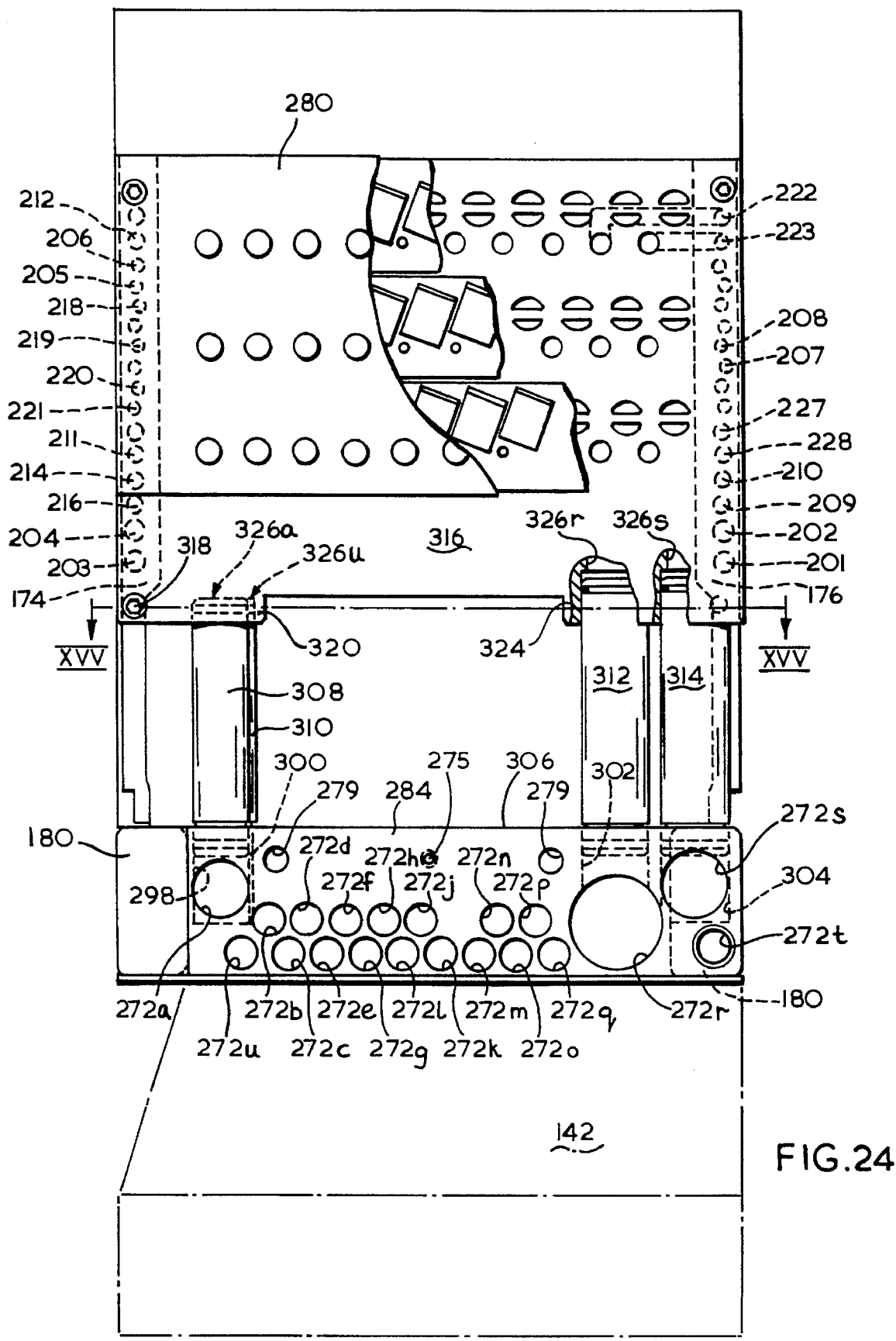
FIG. 24 shows a rear view of the section module, partly broken away.
Figure 26:
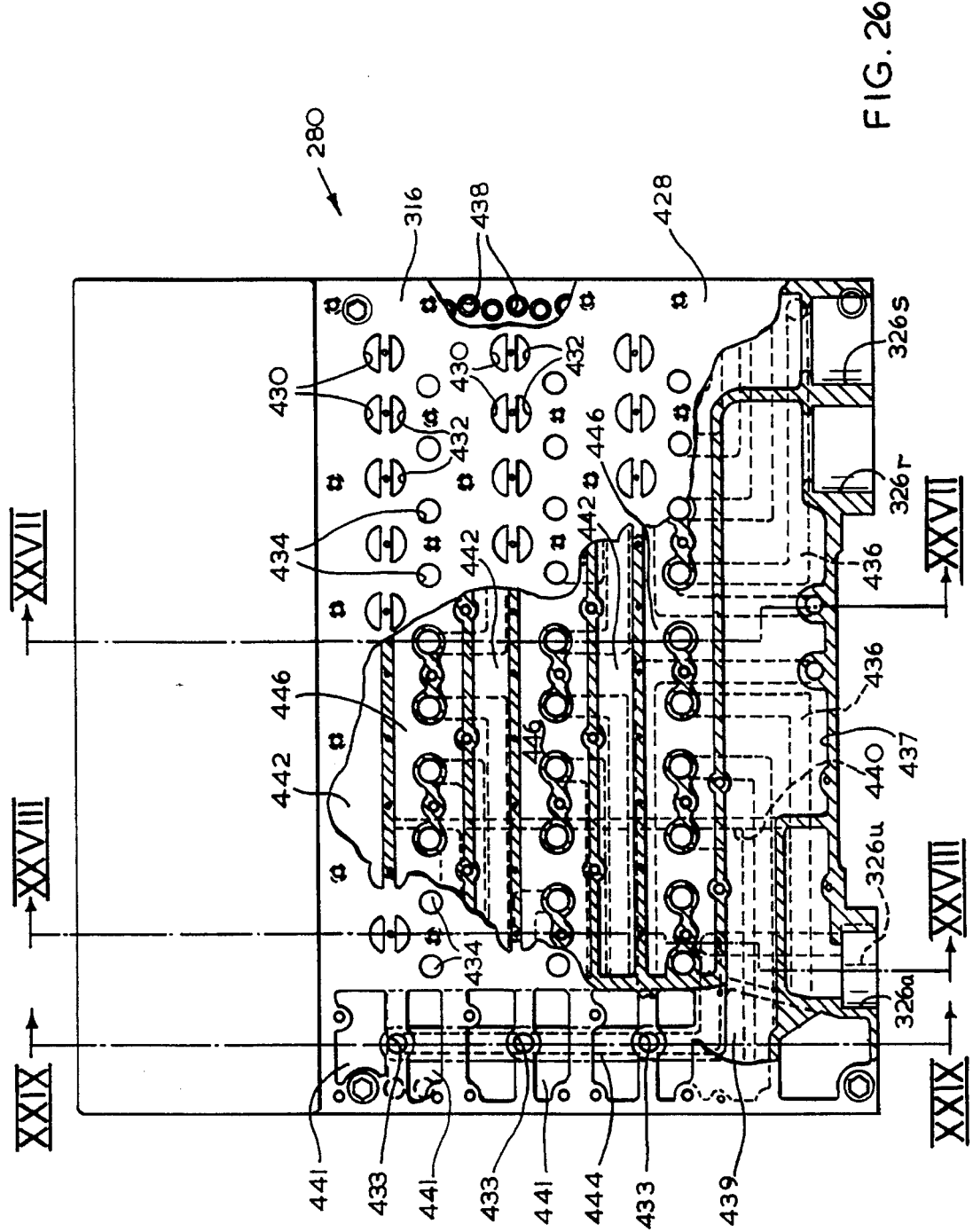
FIG. 26 shows rear view of a valve block, with some parts broken away

From the circuit diagram in FIG. 20D it can be seen that, for NNPB operation, when the valve 118k is caused to operate, air at a pressure determined by valve 116e will pass through the valve 118k, through the outlet port 112n of the piping module and thence to the exit port 296n of the piping block 284. Hence it is conveyed through a pipe 290 to the plunger mechanism to operate the plunger cooling for the outer plunger. In a blow operation, instead of operating the plunger cooling, this same air will operate the counter blow air.

Operation of the valve 118m cause the connection of the vacuum to the outlet port 112o, and thence to the exit port 296o of the piping block 284. Again, a pipe 290 connects 296o to the plunger mechanism. Vacuum is only required at the plunger for a blow and blow operation.

The mechanisms which are mounted in the openings 255–268 in the top plate 178 of the frame of the section module are generally conventional in construction, but are modified so that in general they are mounted only on the top plate 178 to cooperate with the air exit ports on the top plate, and are also mounted that they can readily be removed from the top plate without requiring access to the interior of the section module.

The mould opening and closing mechanisms are as conveniently described in our pending application EP 93300145 and EP 93300146. The mounting of a blow head mechanism and of a takeout mechanism will be described, and it will be understood that the principles used in mounting these mechanisms on the top plate 178 can readily be adapted to other mechanisms.

Figure 32:
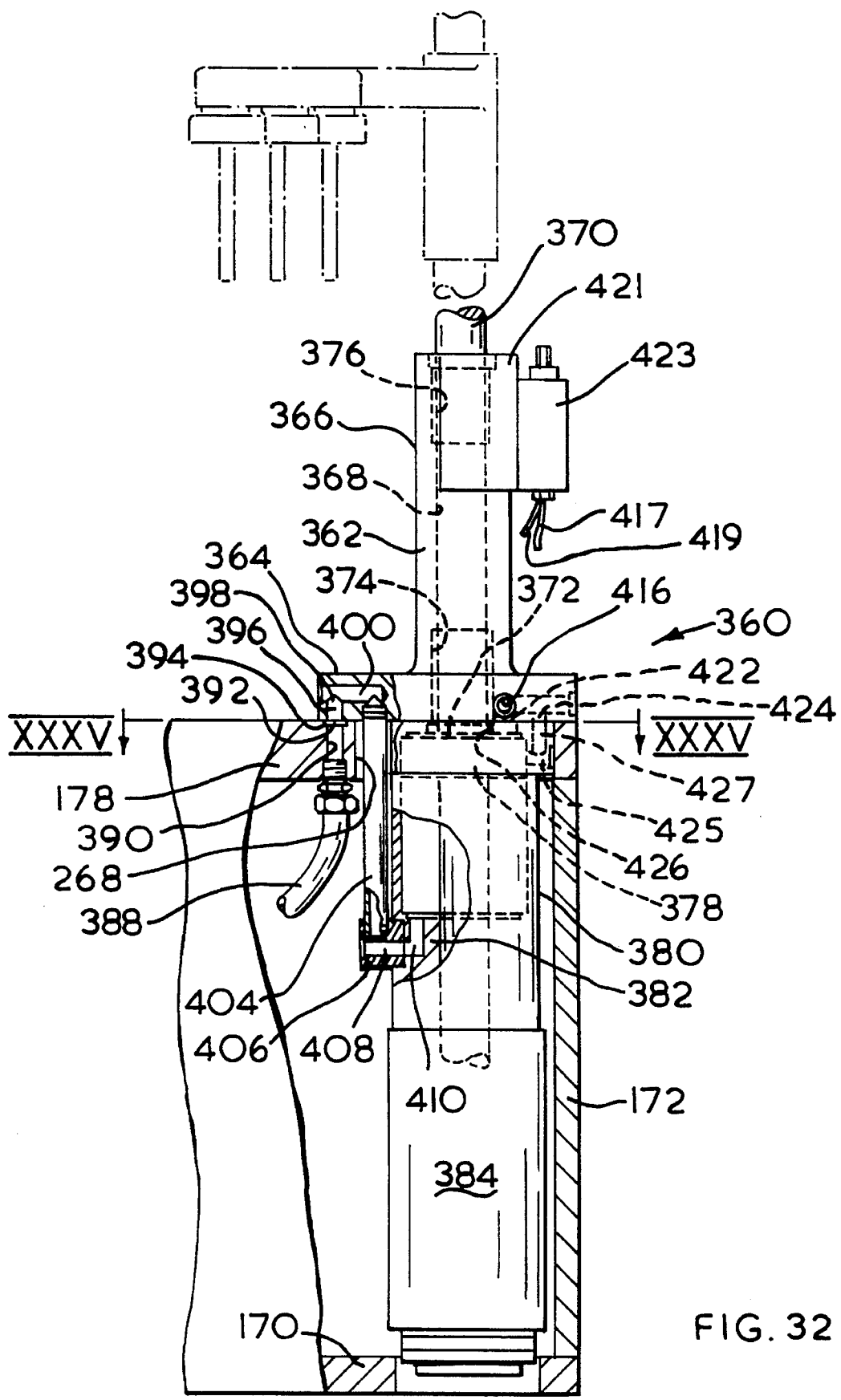
FIG. 32 shows a view, partly broken away, of a blowhead mechanism
Figure 33:
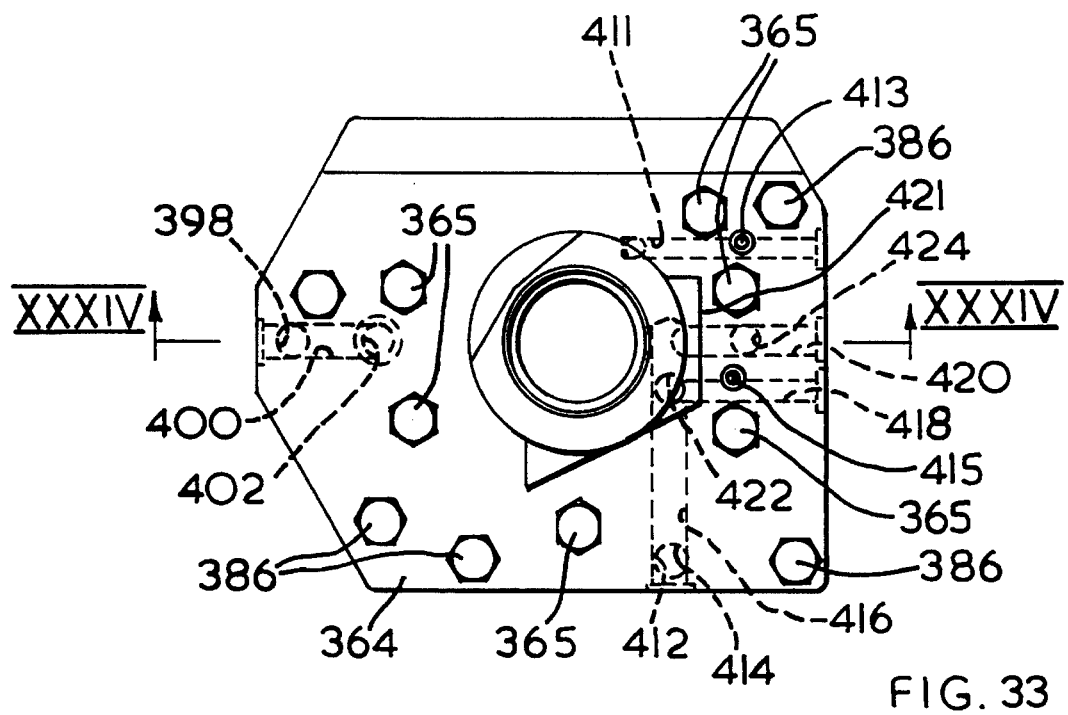
FIG. 33 shows a plain view of a supporting member of the blow head mechanism
Figure 34:
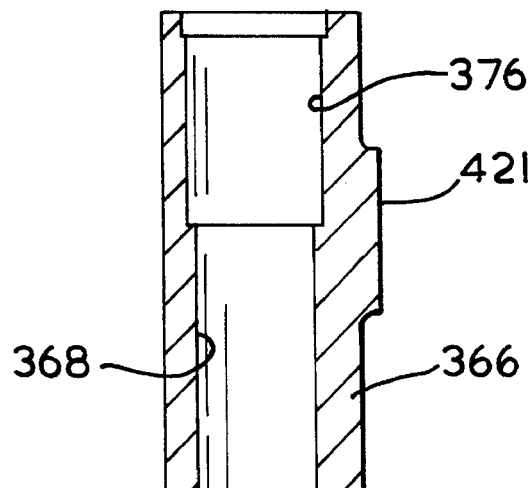
FIG. 34 shows a view in section along the line XXXIV—XXXIV of FIG. 33
Figure 35:
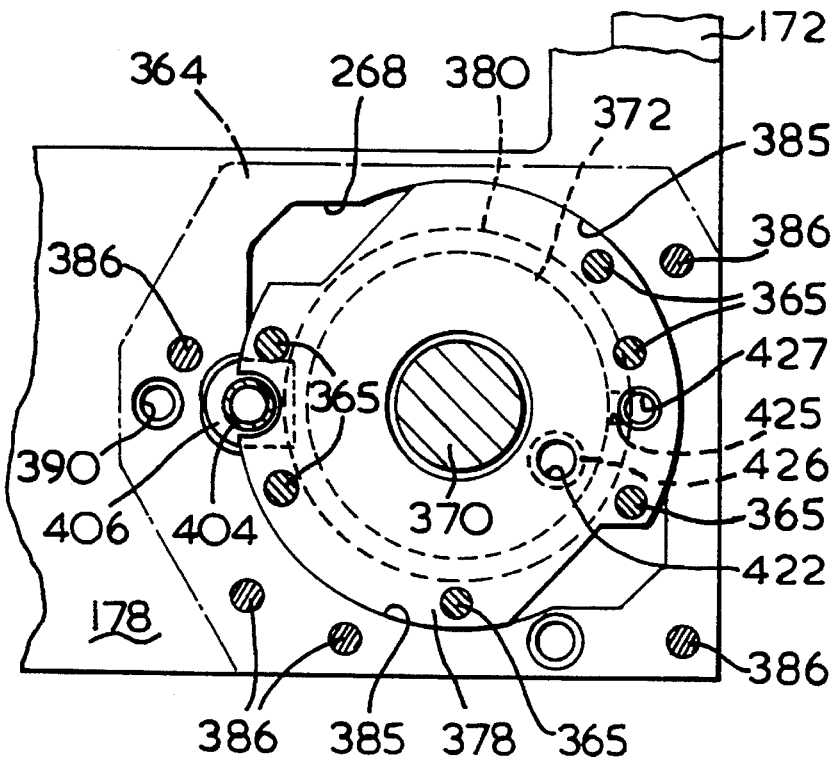
FIG. 35 shows a view taken along the line XXXV—XXXV of FIG. 32

A blowhead mechanism 360 (FIGS. 30,31 and 32) is described to illustrate the positioning of operating mechanisms in the section module of the machine. The operating portions of the blowhead mechanism, which are only shown diagrammatically, are similar to those conventionally used, while the mounting of the mechanism in the section and its connection to the necessary air supplies are described in detail.

The blowhead mechanism comprises a base member 362 which comprises a flange portion 364 and an upstanding cylindrical portion 366. The cylindrical portion has a vertical bore 368 in which a piston rod 370 which carries a piston head 372 moves. The bore 368 also comprises relieved portions 374, 376.

Secured to the flange portion 364 by bolts 365 is cylinder head member 378 to which is attached a downwardly extending cylinder 380 in which is secured a lower cylinder head member 382; the piston rod 370 extends through both the head members 378 and 382. An operating cylinder is thus provided by the cylinder 380 and the two head members 378 and 382, and the piston head 372 lies in this operating cylinder. A lower sleeve 384 is secured to the cylinder 380 and a conventional oil cushioning device (not shown) which acts on the piston rod 320 is mounted in the sleeve 384.

Mounted in the sleeve 384 is a conventional camming arrangement (not shown) which causes the piston rod 370 to rotate in a desired fashion while performing a reciprocating movement.

The flange portion 364 comprises a horizontal downwardly facing surface 367 which engages the horizontal upper surface 236 of the top plate 178, and the cylinder head member 378, the cylinder 380 and the sleeve 384 extend downwardly from the top plate 178 through the aperture 268.

The cylinder head member 378 has a part circular outline, comprising two arcs 385,385, which closely engage inner circular faces of the aperture 268 when the blow head mechanism is in position. The blow head mechanism is thus precisely located, firstly be the engagement of the arcs 385, 385 in the aperture 260, and also by bolts 386 securing the flange portion 364 to the top plate 178.

Operating air for the blow head mechanism 360 is provided from ports in the top plate 178. Blowhead up air is provided through a pipe 388 which leads to an exit port 240 (see FIG. 15) in the under surface of the top plate 178 and is connected, in a fashion similar to that shown in FIG. 15, to one of the air passageways 186 in the sidewall 176. The pipe 388 is connected to a passageway 390 in the top plate 178 which opens to an exit port 392 surrounded by an 0 ring 394. The port 392 mates with an entry port 396 in the flange portion 364 and leads through a vertical bore 398, a transverse horizontal bore 400, and a downward bore 402 to a pipe 404 which leads to a bore 408 through a block 406 fixed in the cylinder 380 and a passageway 410 in the head member 382 into the interior of the cylinder 380 below the piston head 372.

Blowhead down air is similarly provided from an exit port (not shown) in the upper surface of the top plate 178 which mates with an entry port 412 in the flange portion which leads to a vertical bore 414 which leads to a horizontal bore 416. The bore 416 connects to two transverse horizontal bores 418,420 and to a downward bore 422. Another downward bore 424 connects to the horizontal bore 420. The bore 422 leads, through a check valve 426 in the cylinder head member 378 into the interior of the cylinder 380 above the piston head 372: the bore 424 leads through a vertical bore 427 and a horizontal bore 425 into the interior of the cylinder 380.

A conventional cushioning adjustment 423 is secured to a block 421 fixed to the cylindrical portion 366. Two pipes 419,417 lead to two exit ports 413, 415 in the upper surface of the flange portion. The exit port 413 is connected to a transverse bore 411 in the flange portion 364 which is connected to the interior of the cylinder 380 above the piston head 372 by a passage (not shown).

The exit port 415 connects to the transverse bore 418.

As the piston head 372 moves towards completion of its up stroke, the piston head covers the bore 425, so that air cannot pass out through the bore: air is prevented from passing out through the bore 422 because of the check valve, and is thus forced into the transverse bore 411, thence to the pipe 419 to the cushioning adjustment 423. Air is exhausted from this adjustment through the pipe 417 to the port 415 and the transverse bore 418. Cushioning of the ends of the up stroke is thus provided.

It can be seen that the contour of the parts of the blow head mechanism 360 below the top plate 178 is smaller than the contour of the aperture 268, and thus, by undoing the bolts 386 the blowhead mechanism can be removed from the aperture 268 as a whole: there is no need to undo any pipe connections. A repaired or replacement mechanism can then be replaced in the aperture 268, and on replacing and tightening the screws 366 the air connections are made between the exit ports in the top plate 178 and the entry ports in the under surface of the flange portion 364. The mechanism is automatically positioned in its correct vertical position by engagement between the downwardly facing surface of the flange portion 364 and the surface 236 of the top plate 178, and correctly positioned by the engagement of the arcs 385, 385 of the cylinder head member 378, with the aperture 260, and correctly oriented by the bolts 386.

While the supply of lubricating oil and oil for the oil cushioning device is not described, it will be understood that arrangements are made to supply the oil from ports in the top plate 178 similar to those to supply operating air, and that consequently no extra operation to ensure supply of oil is necessary when replacing a mechanism.

Figure 37:
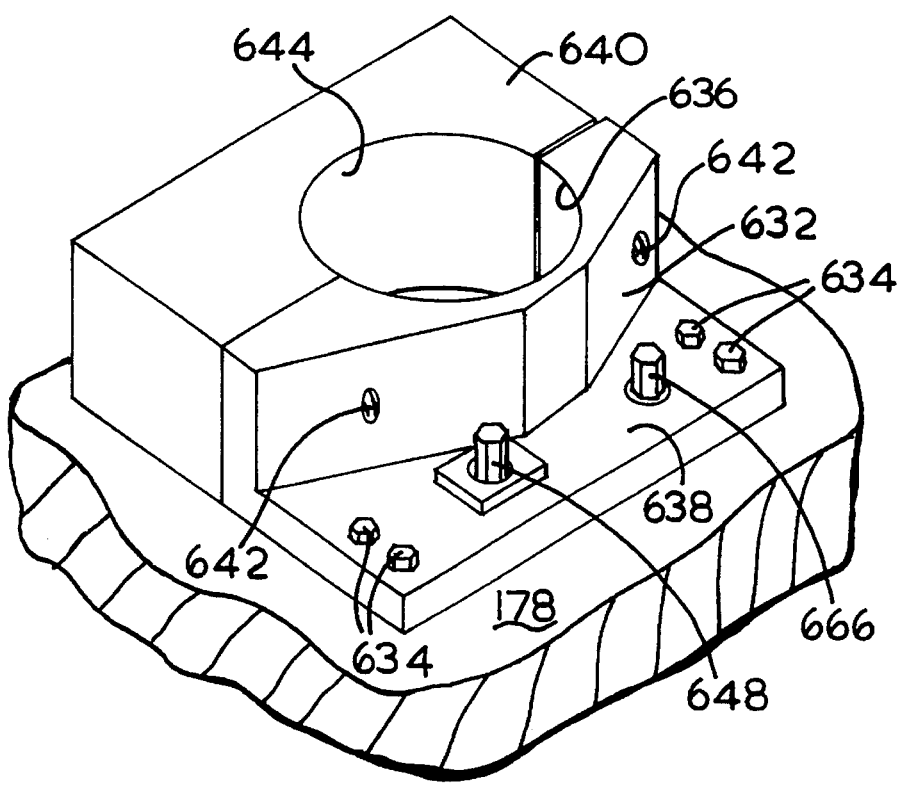
FIG. 37 shows a view of locating blocks of the take out mechanism
Figure 36:
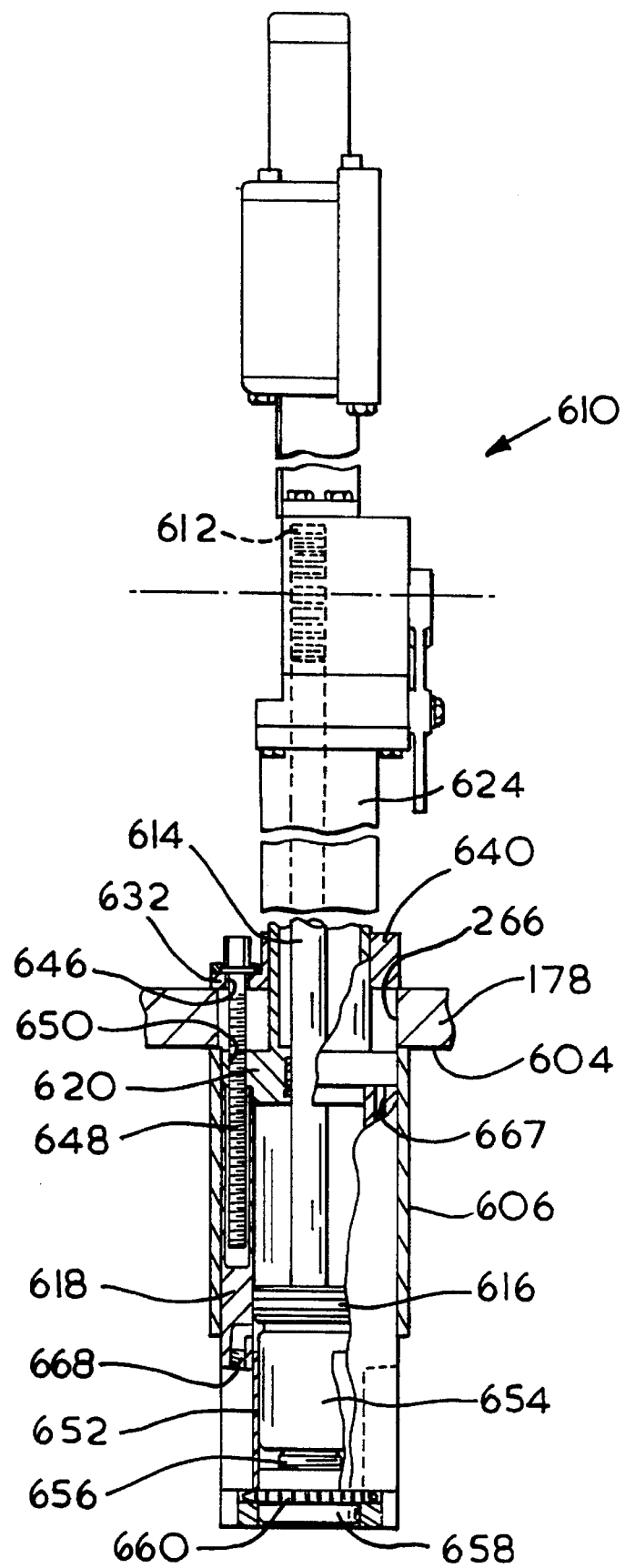
FIG. 36 shows a view, partly broken away of a take out mechanism
Figure 38:
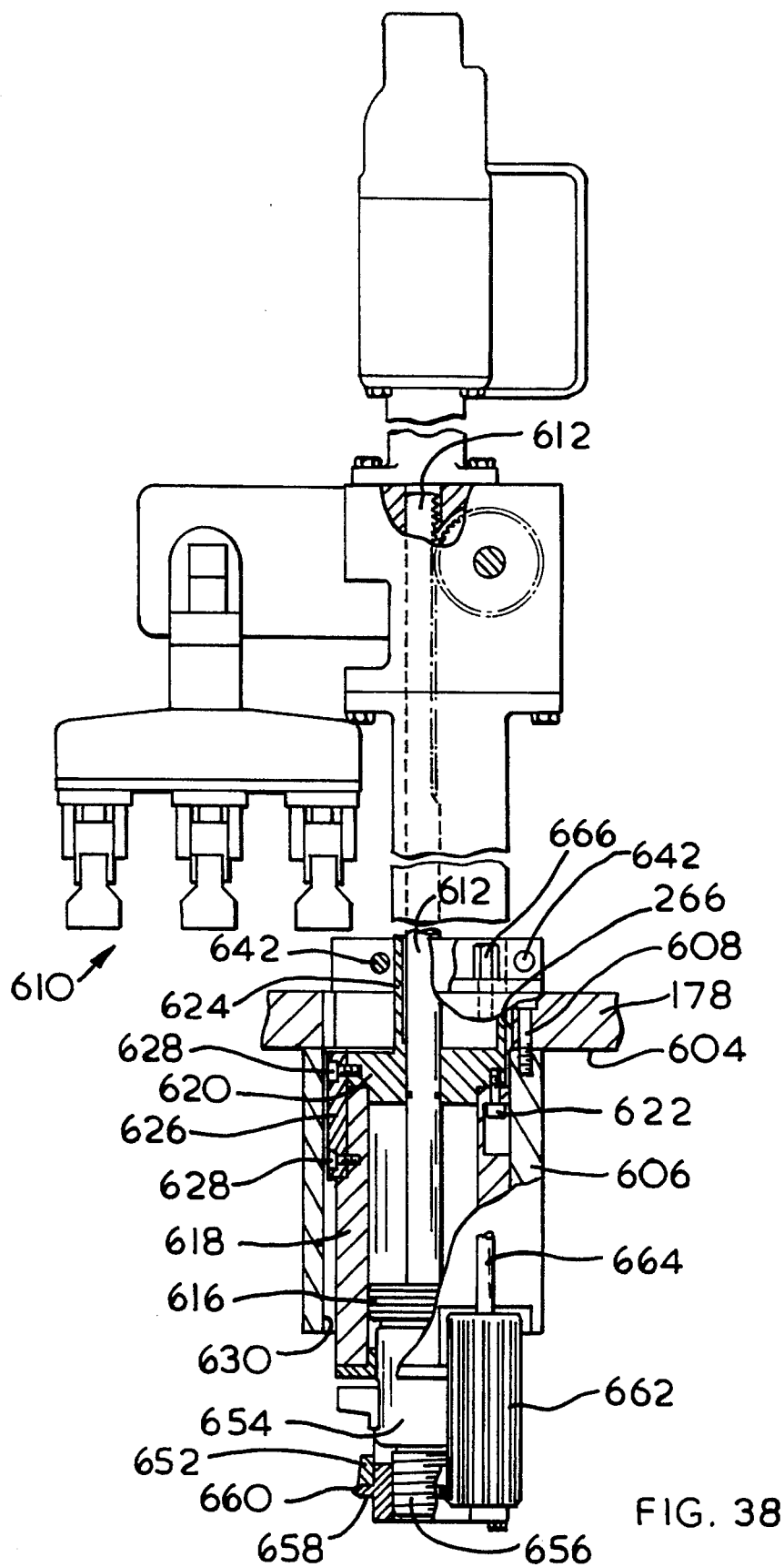
FIG. 38 shows a view corresponding to FIG. 36 but viewed at right angles to it.

A takeout mechanism of the I.S. machine is shown in FIGS. 36,37 and 38. This mechanism is readily locatable in the machine, and can be replaced with much less work than previous such mechanisms, but is not, unlike other mechanisms of the machine, supplied with operating air through passages in the machine frame: accessibility to the take out mechanism from the end of the section means that the advantages of such an air supply would not be as significant as with other mechanisms.

Extending downwardly from an underface 604 of the top plate 178 adjacent the aperture 266 is a locating sleeve 606, which is secured to the top plate 178 by bolts 608, only one of which is shown.

The take out mechanism comprise a conventional take out head 610 operated by rack 612 which extends upwardly from a piston rod 614. The piston rod 614 is secured to a piston head 616 which is mounted for movement in a cylinder 618. An upper end of the cylinder 618 is closed by a head member 620 which is secured to the cylinder 618 by three bolts 622 (only one of which is shown). The head member 620 is welded to a cylindrical shroud 624: the piston rod 614 passes through the head member 620 and extends upwardly to the rack 612.

The cylinder 618 is a close fit in the locating sleeve 606 and comprises a key 626 secured to it by bolts 628 (one of which extends into the head member 620) which key is a close fit in a keyway 630 formed in the inner surface of the sleeve 606. It will be understood that the locating sleeve 606 thus accurately locates the cylinder 618 both along its vertical axis and radially of that axis.

The shroud 624 extends freely through the aperture 266. Secured to the upper face of the top plate 178 by bolts 634 is a locating block 632 having a semi circular locating recess 636 and a flange portion 638, through which the bolts 634 pass. A further locating block 640 is secured to the block 632 by bolts 642 and comprises a similar locating recess 644—on tightening of the bolts 642 the recesses 636 and 644 closely engage the shroud 624 and clamp it securely in position.

Passing through a bore 646 in the flange portion 638 is a long bolt 648 whose head engages the flange portion 638 and whose screw threaded shank is engaged in a threaded bore 650 in the head member 620, the shank extending into a bore in the wall of the cylinder 618. If the clamp provided by the block 632,640 is released by slackening the bolts 642, the height of the cylinder 618, and thus of the take out mechanism, can be adjusted by rotation of the bolt 648.

Secured to a lower end portion of the cylinder 618 is a part cylindrical supporting sleeve 652. A stroke limiting and cushioning device 654 of conventional construction is slidably mounted in the sleeve 652 and comprises a threaded boss 656 which extends downwardly into a rotatable member 658 which is mounted against axial movement but free to rotate in the sleeve 652. The member 658 has an external gear ring 660 which engages an elongated pinion 662 which is mounted on a shaft 664 which extends through the wall of the sleeve 606 and through the top plate 178 and the flange portion 638 to an adjusting bolt head 666. Rotation of the head 666 thus causes rotation of the shaft 664 and the pinion 662. This causes rotation of the member 658 which causes axial movement of the boss 656 and thus of the stroke limiting and cushioning device 654. Thus the lower most position of the piston rod 614 and thus an end position of the takeout mechanism can be adjusted.

Air is supplied to the interior of the cylinder 618 through appropriate passages (e.g.667) in the wall of the cylinder 618 which lead to openings 668 (only one of which is shown). Quick release couplings (not shown) are provided for the connection of air supplies to these openings.

The takeout mechanisms can readily be removed and replaced in the machine. To remove the mechanism, the bolt 648 is removed, and the pinion 662 and the shaft 664 are also removed. The two air lines are uncoupled and then if the block 640 is loosened by loosening the bolts 642, the mechanism can be removed upwardly from the machine. Replacement of the mechanism follows the reverse procedure, the mechanism being vertically aligned by the locating sleeve 606 and orientated by the key 626. Height adjustment can be obtained by adjustment of the bolt 648, and fine adjustment of the lower end of the stroke of the piston obtained by adjustment of the portion of the cushioning device 654 by rotation of the bolt head 666.

I claim:

1. In an individual section glassware forming machine comprising a plurality of sections arranged side by side at section stations the improvement comprising; each of said sections including each including a section module for supporting a plurality of section mechanisms and for receiving cooling air at the bottom thereof, a base frame including
        conduit means for delivering cooling air to the bottom of said section module and
        a pair of parallel rails each having a flat upper surface, said section module including a pair of parallel spaced girders each having a flat lower surface for matingly engaging with one of said flat upper surfaces, a plurality of rollers supported by each of said girders for rolling engagement with said flat upper surfaces, and a corresponding plurality of cut outs located in each of said flat upper surfaces so that when a section module is rolled relative to a corresponding pair of parallel rails until said plurality of rollers are located over said cut outs, said upper and lower surfaces will become matingly engaged so that cooling air can be delivered from said conduit means into said section module.

2. An individual section glass forming machine according to claim 1, wherein said cut outs are larger than said plurality of rollers and further comprising means for sliding each of said section modules along said corresponding base frame when said plurality of rollers are located within said cut outs, and stop means for precisely locating one of said sliding section modules.

3. In an individual section glassware forming machine comprising a plurality of sections arranged side by side at section stations the improvement comprising; each of said sections including a base frame including a first pair of parallel support rails, a section module for supporting a plurality of section mechanisms, said section module including first support surface means for engaging with said first pair of support rails so that said section module can be placed on said first pair of support rails, means for securing said section module at a selected location relative to said first pair of rails, said section module further comprising a first sealing surface and a plurality of air conduits communicating with said first sealing surface, said base frame including a second pair of parallel support rails, a piping module including a second sealing surface, a corresponding plurality of air conduits communicating with said second sealing surface, and second support surface means for engaging with said second pair of support rails so that said piping module can be placed on said second pair of support rails, said first and second sealing surfaces being oriented so that when said piping module is placed on said second pair of support rails and said section module is placed on said first pair of support rails, said first and second sealing surfaces can be placed in mating engagement establishing communication between said plurality of section module air conduits and a corresponding plurality of air conduits of said piping module, and a sealing means for providing a fluid tight seal between said corresponding plurality of air conduits of said piping module.

4. An individual section glassware forming machine according to claim 3, wherein said first and second sealing surfaces are both vertically positioned.

5. In an individual section glassware forming machine comprising a plurality of sections arranged side by side at section stations the improvement comprising; each including a base frame including
a pair of support rails having a plurality of cut outs,
air conduit means including a block having a plurality of air supply passages,
said block having a horizontal top surface and
said plurality air supply passages communicating with said horizontal top surface, a piping module including
support surface means,
a corresponding plurality of rollers projecting downwardly from said support surface means for rolling engagement with said pair of support rails so that said piping module can be rolled along said pair of support rails until said plurality of rollers enter said cut outs whereby said support surface means will come into engagement with said pair of support rails, air conduit means including a connector having a corresponding plurality of air supply passages said connector having a horizontal bottom surface located so that said horizontal bottom surface will come into engagement with said horizontal top surface of said block when said support surface means comes into engagement with said pair of support rails, to establish the connection of said plurality of block air passages with said plurality of connector air passages.

* * * * *